United States Patent
Saito et al.

(10) Patent No.: US 9,487,703 B2
(45) Date of Patent: *Nov. 8, 2016

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,221

(22) Filed: Dec. 5, 2014

(65) Prior Publication Data

US 2015/0166891 A1 Jun. 18, 2015

(30) Foreign Application Priority Data

Dec. 12, 2013 (JP) ................................. 2013-256664
Oct. 14, 2014 (JP) ................................. 2014-209855

(51) Int. Cl.
*C09K 19/20* (2006.01)
*C09K 19/34* (2006.01)
*C09K 19/30* (2006.01)
*C09K 19/04* (2006.01)

(52) U.S. Cl.
CPC ........... *C09K 19/3402* (2013.01); *C09K 19/20* (2013.01); *C09K 19/3066* (2013.01); *C09K 19/3068* (2013.01); *C09K 2019/0444* (2013.01); *C09K 2019/0466* (2013.01); *C09K 2019/301* (2013.01); *C09K 2019/3004* (2013.01); *C09K 2019/3009* (2013.01); *C09K 2019/3071* (2013.01); *C09K 2019/3078* (2013.01); *C09K 2019/3083* (2013.01); *C09K 2019/3422* (2013.01); *C09K 2019/3425* (2013.01)

(58) Field of Classification Search
CPC ...................................................... C09K 19/12
See application file for complete search history.

(56) References Cited

U.S. PATENT DOCUMENTS 5,858,270 A    1/1999   Matsui et al.
7,029,731 B2 * 4/2006   Tarumi ................. C09K 19/12
                                                    252/299.61

FOREIGN PATENT DOCUMENTS

JP    02-233626    9/1990
WO    96-11897     4/1996

* cited by examiner

Primary Examiner — Chanceity Robinson
(74) Attorney, Agent, or Firm — Jianq Chyun IP Office

(57) ABSTRACT

A liquid crystal composition and an AM-type liquid crystal display device including the same are described. The liquid crystal composition has a nematic phase, contains a specific compound having a large positive dielectric anisotropy as a first component, and a specific compound having a small viscosity as a second component, and may also contain at least one of a specific compound having a high maximum temperature or a small viscosity as a third component, a specific compound having a large positive dielectric anisotropy as a fourth component, and a specific compound having a negative dielectric anisotropy as a fifth component.

20 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2013-256664, filed on Dec. 12, 2013, and Japanese application serial no. 2014-209855, filed on Oct. 14, 2014. The entirety of each of the above-mentioned patent applications is hereby incorporated by reference herein and made a part of this specification.

TECHNICAL FIELD

The invention relates to a liquid crystal composition, a liquid crystal display (LCD) device including the composition, and so on, and particularly relates to a liquid crystal composition having a positive dielectric anisotropy, and an active matrix (AM) LCD device including the composition and having a TN, OCB, IPS, FFS or FPA mode.

BACKGROUND ART

For LCD devices, a classification based on the operating mode of liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on the driving mode of device includes passive matrix (PM) and active matrix (AM) types. The PM types are classified into static type, multiplex type and so forth, and the AM types are classified into thin film transistor (TFT) type, metal insulator metal (MIM) type and so forth. The TFT type is further classified into amorphous silicon type and polycrystal silicon type. The latter is classified into a high temperature type and a low temperature type according to the production process. A classification based on the light source includes a reflective type utilizing natural light, a transmissive type utilizing a backlight and a transreflective type utilizing both the natural light and a backlight.

The liquid crystal display device includes a liquid crystal composition having a nematic phase. The composition has suitable characteristics. An AM device having good characteristics can be obtained by improving the characteristics of the composition. Table 1 below summarizes a relationship between the two groups of characteristics. The characteristics of the composition will be further described based on a commercially available AM device. The temperature range of nematic phase relates to a temperature range in which the device can be used. A preferred maximum temperature of nematic phase is about 70° C. or higher and a preferred minimum temperature of nematic phase is about −10° C. or lower. The viscosity of the composition relates to the response time of the device. A short response time is preferred for displaying moving images on the device. A shorter response time even by one millisecond is desirable. Accordingly, a small viscosity in the composition is preferred. A small viscosity at a low temperature is more preferred. The elastic constant of the composition relates to the contrast of the device. In order to improve the contrast of the device, a large elastic constant of the composition is more preferred.

TABLE 1

Characteristics of Composition and AM Device

| No. | Characteristics of Composition | Characteristics of AM Device |
|---|---|---|
| 1 | Wide temperature range of nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption, Large contrast ratio |
| 5 | Large specific resistance | Large voltage holding ratio, and large contrast ratio |
| 6 | High stability to UV light and heat | Long service life |
| 7 | Large elastic constant | Large contrast ratio, and short response time |

[1] A liquid crystal composition can be injected into an LCD device in a shorter period of time.

The optical anisotropy of the composition relates to the contrast ratio of the device. According to the mode of the device, a large optical anisotropy or a small optical anisotropy, more specifically, a suitable optical anisotropy is required. The product (Δn×d) of the optical anisotropy (Δn) of the composition and a cell gap (d) in the device is designed so as to maximize the contrast ratio. A suitable value of the product depends on the type of the operating mode. The suitable value is about 0.45 μm for a device having a TN mode or the like. In the above case, a composition having a large optical anisotropy is preferred for a device having a small cell gap. A large dielectric anisotropy in the composition contributes to a low threshold voltage, small power consumption and a large contrast ratio of the device, so a large dielectric anisotropy is preferred. A large specific resistance of the composition contributes to a large voltage holding ratio and a large contrast ratio of the device, so a composition having a large specific resistance at room temperature and also at a temperature close to the maximum temperature of nematic phase in an initial stage is preferred, and a composition having a large specific resistance at room temperature and also at a temperature close to the maximum temperature of nematic phase after the device has been used for a long period of time is preferred. Stability of the composition to UV light and heat relates to a service life of the LCD device. In a case where the stability is high, the device has a long service life. Such characteristics are preferred for AM devices used in a liquid crystal projector, a liquid crystal television and so on.

A composition having a positive dielectric anisotropy is used for an AM device of a TN mode. A composition having a negative dielectric anisotropy is used for an AM device of a VA mode. A composition having a positive or negative dielectric anisotropy is used for an AM device of an IPS or FFS mode. A composition having a positive or negative dielectric anisotropy is used for an AM device of a polymer sustained alignment (PSA) mode. Examples of the liquid crystal composition having a positive dielectric anisotropy are disclosed in Patent literature No. 1 or No. 2 below.

Patent literature No. 1: JP H2-233626 A.
Patent literature No. 2: WO 1996/11897 A.

SUMMARY OF INVENTION

Accordingly, the invention provides a liquid crystal composition satisfying at least one of characteristics such as a high maximum temperature of nematic phase, a low minimum temperature of nematic phase, a small viscosity, a suitable optical anisotropy, a large dielectric anisotropy, a large specific resistance, a high stability to UV light, a high stability to heat, and a large elastic constant, or provides a liquid crystal composition having a suitable balance between at least two of the characteristics. The invention also provides an LCD device including such a composition. The invention further provides an AM device having characteristics such as a short response time, a large voltage holding ratio, a low threshold voltage, a large contrast ratio and a long service life.

The liquid crystal composition of the invention has a nematic phase, and contains at least one compound selected from the group of compounds represented by formula (1) as a first component and at least one compound selected from the group of compounds represented by formula (2) as a second component:

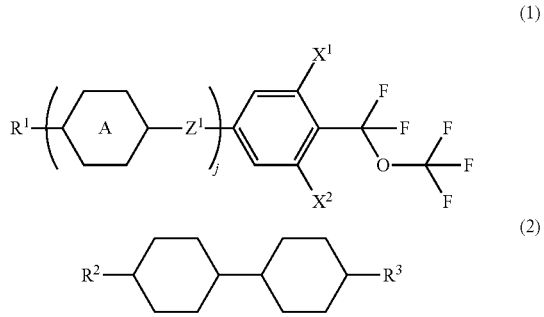

wherein in formulas (1) and (2), $R^1$ is alkyl having 1 to 12 carbons, alkoxy having 1 to 12 carbons or alkenyl having 2 to 12 carbons; $R^2$ is alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; $R^3$ is alkenyl having 2 to 12 carbons, or alkenyl having 2 to 12 carbons in which at least one hydrogen is replaced by halogen; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, tetrahydropyran-2,5-diyl or naphthalene-2,6-diyl; $Z^1$ is a single bond, ethylene, vinylene, methyleneoxy, carbonyloxy or difluoromethyleneoxy; $X^1$ and $X^2$ are independently hydrogen or fluorine; and j is 1, 2, 3 or 4.

The invention also concerns a liquid crystal display device including the liquid crystal composition.

The invention further concerns use of the liquid crystal composition in a liquid crystal display device.

The liquid crystal composition of the invention satisfies at least one of characteristics such as a high maximum temperature of nematic phase, a low minimum temperature of nematic phase, a small viscosity, a suitable optical anisotropy, a large dielectric anisotropy, a large specific resistance, a high stability to UV light, a high stability to heat and a large elastic constant, or has a suitable balance between at least two of the characteristics. The AM device containing the same liquid crystal composition has characteristics such as a short response time, a large voltage holding ratio, a low threshold voltage, a large contrast ratio and a long service life.

DESCRIPTION OF EMBODIMENTS

Usage of terms herein is as described below. "Liquid crystal composition" and "LCD device" may be occasionally abbreviated as "composition" and "device," respectively. "LCD device" is a generic term for an LCD panel and an LCD module. "Liquid crystal compound" is a generic term for a compound having a liquid crystal phase such as a nematic phase and a smectic phase, and a compound having no liquid crystal phase but to be mixed with the composition for adjusting characteristics such as the temperature range of nematic phase, viscosity and dielectric anisotropy. The compound has a six-membered ring such as 1,4-cyclohexylene and 1,4-phenylene, and a rod-like molecular structure. "Polymerizable compound" includes a compound to be added for forming a polymer in the composition. At least one compound selected from the group of compounds represented by formula (1) may be occasionally abbreviated as "compound (1)." "Compound (1)" means one compound or two or more compounds represented by formula (1). This rule also applies to any other compound represented by any other formula. "At least one" in the context of "replaced" means that not only a position but also the number thereof may be selected without restriction.

The liquid crystal composition is prepared by mixing a plurality of liquid crystal compounds. The proportion (content) of each liquid crystal compounds is expressed in terms of weight percent (wt %) based on the weight of the liquid crystal composition. An additive such as an optically active compound, an antioxidant, an UV light absorbent, a dye, an antifoaming agent, a polymerizable compound, a polymerization initiator and a polymerization inhibitor is added to the liquid crystal composition as required. The proportion (content) of the additive is expressed in terms of weight percent (wt %) based on the weight of the liquid crystal composition in a manner similar to the proportion of the liquid crystal compound. Weight parts per million (ppm) may be occasionally used. The proportion of the polymerization initiator or the polymerization inhibitor is exceptionally expressed based on the weight of the polymerizable compound.

"Higher limit of the temperature range of nematic phase" may be occasionally abbreviated as "maximum temperature." "Lower limit of the temperature range of nematic phase" may be occasionally abbreviated as "minimum temperature." The expression "having a large specific resistance" means that the composition has a large specific resistance at room temperature and also at a temperature close to the maximum temperature of nematic phase in an initial stage, and that the composition has a large specific resistance at room temperature and also at a temperature close to the maximum temperature of nematic phase even after the device has been used for a long period of time. The expression "having a large voltage holding ratio" means that the device has a large voltage holding ratio at room temperature and also at a temperature close to the maximum temperature of nematic phase in an initial stage, and that the device has a large voltage holding ratio at room temperature and also at a temperature close to the maximum temperature of nematic phase even after the device has been used for a long period of time.

An expression "at least one 'A' may be replaced by 'B'" means that the number of 'A' is arbitrary. The position of 'A' is arbitrary when the number of 'A' is 1. When the number of 'A' is two or more, their positions can be selected without restriction. The same rule also applies to an expression "at least one of 'A' is replaced by 'B'."

A symbol of terminal group $R^1$ is used for a plurality of compounds in the chemical formulas of component compounds. In the compounds, two groups represented by arbitrary two $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. This rule also applies to a symbol $R^4$, $X^1$ or the like. In formula (1), when j is 2, two rings A exist. In the compound, two rings represented by two rings A may be identical or different. This rule also applies to arbitrary two rings A when j is larger than 2. This rule also applies to $Z^1$, ring B or the like.

Then, 2-fluoro-1,4-phenylene means two divalent groups described below. In the chemical formula thereof, fluorine may be leftward (L) or rightward (R). This rule also applies to other divalent asymmetric rings such as tetrahydropyran-2,5-diyl.

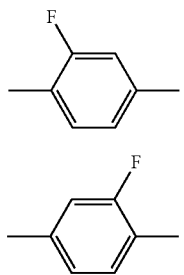

The invention includes the items described below.

Item 1 is a liquid crystal composition that has a nematic phase and contains at least one compound selected from the group of compounds represented by formula (1) as a first component and at least one compound selected from the group of compounds represented by formula (2) as a second component:

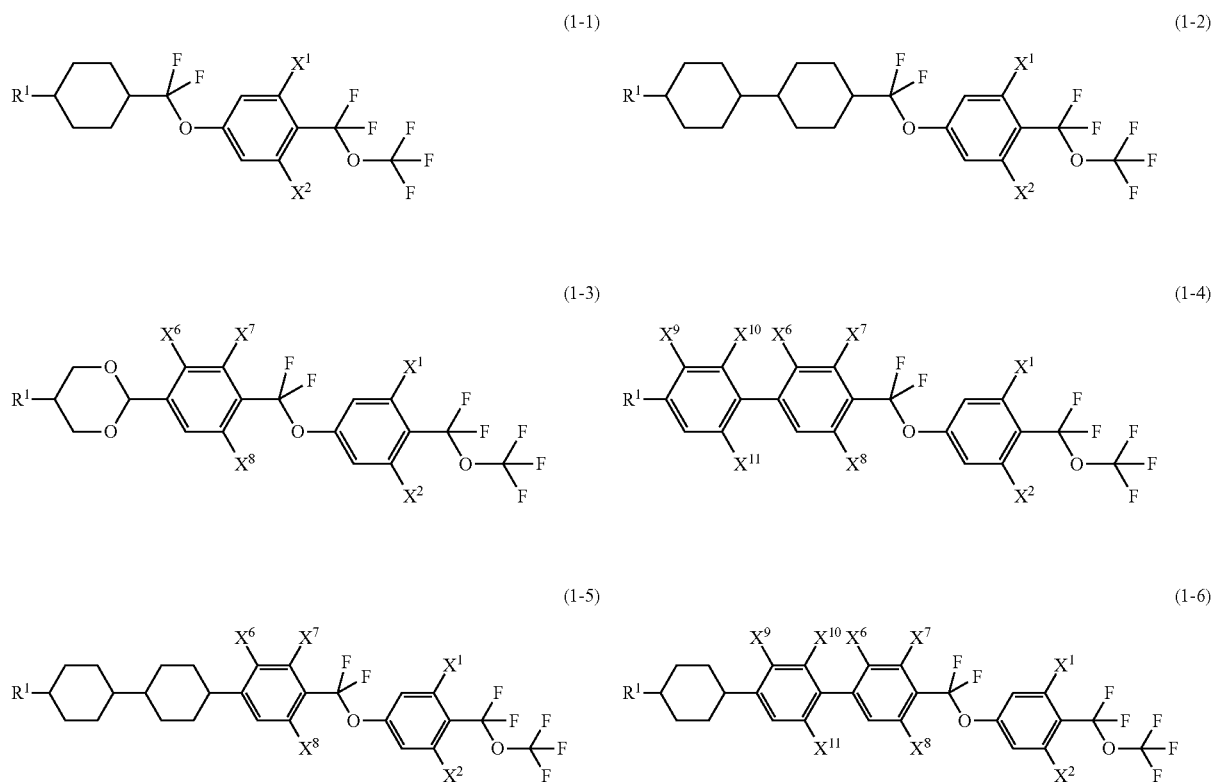

wherein in formulas (1) and (2), $R^1$ is alkyl having 1 to 12 carbons, alkoxy having 1 to 12 carbons or alkenyl having 2 to 12 carbons; $R^2$ is alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; $R^3$ is alkenyl having 2 to 12 carbons, or alkenyl having 2 to 12 carbons in which at least one hydrogen is replaced by halogen; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, tetrahydropyran-2,5-diyl or naphthalene-2,6-diyl; $Z^1$ is a single bond, ethylene, vinylene, methyleneoxy, carbonyloxy or difluoromethyleneoxy; $X^1$ and $X^2$ are independently hydrogen or fluorine; and j is 1, 2, 3 or 4.

Item 2 is the liquid crystal composition of item 1 which contains at least one compound selected from the group of compounds represented by formulas (1-1) to (1-14) as the first component:

(1-7)
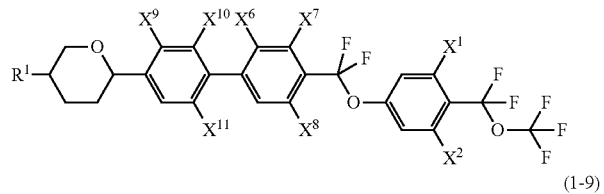
(1-8)

(1-9)
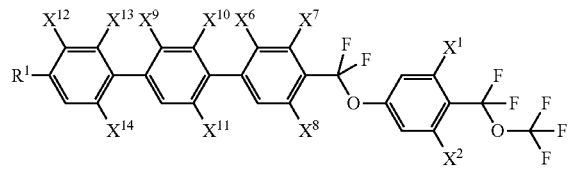
(1-10)
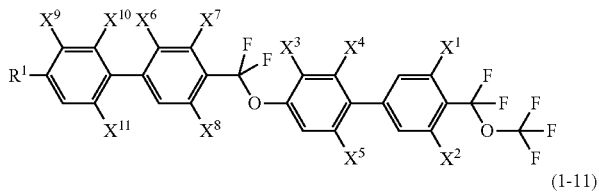

(1-11)
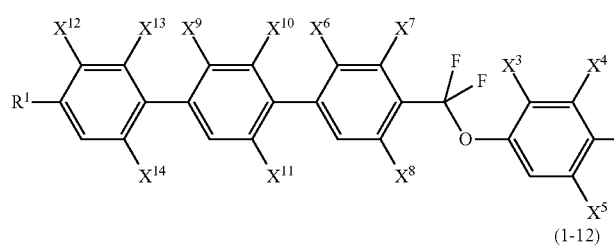

(1-12)
(1-13)
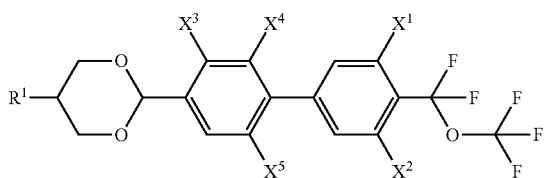

(1-14)
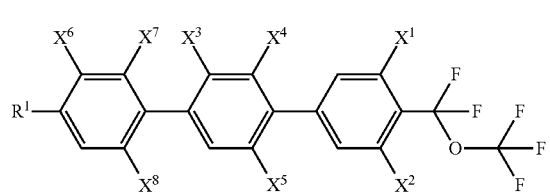

wherein in formulas (1-1) to (1-14), $R^1$ is alkyl having 1 to 12 carbons, alkoxy having 1 to 12 carbons or alkenyl having 2 to 12 carbons; and $X^1$, $X^2$, $X^3$, $X^4$, $X^5$, $X^6$, $X^7$, $X^8$, $X^9$, $X^{10}$, $X^{11}$, $X^{12}$, $X^{13}$ and $X^{14}$ are independently hydrogen or fluorine.

Item 3 is the liquid crystal composition of item 1 or 2 in which the proportion of the first component is in the range of 5 wt % to 40 wt %, and the proportion of the second component is in the range of 5 wt % to 60 wt %, based on the weight of the liquid crystal composition.

Item 4 is the liquid crystal composition of any one of items 1 to 3 which further contains at least one compound selected from the group of compounds represented by formula (3) as a third component:

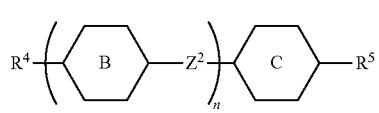
(3)

wherein in formula (3), $R^4$ and $R^5$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3; and when n is 1, ring C is 1,4-phenylene.

Item 5 is the liquid crystal composition of any one of items 1 to 4 which contains at least one compound selected from the group of compounds represented by formulas (3-1) to (3-12) as the third component:

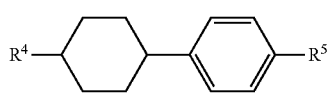
(3-1)

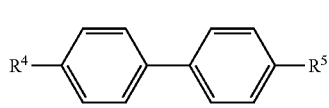
(3-2)

-continued

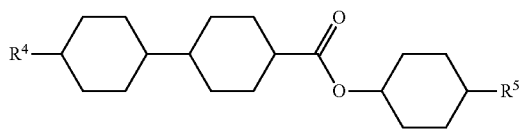
(3-3)

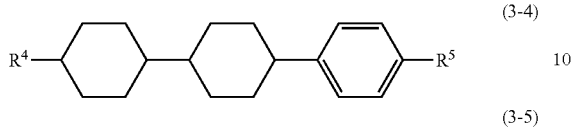
(3-4)

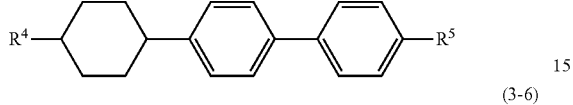
(3-5)

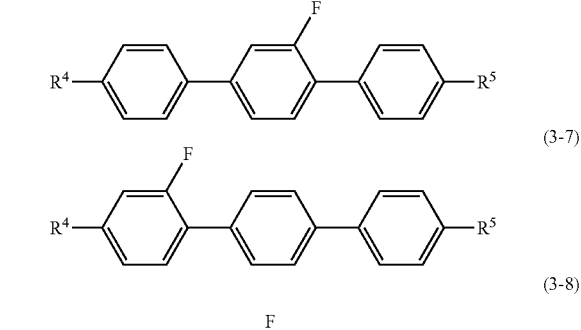
(3-6)

(3-7)

(3-8)

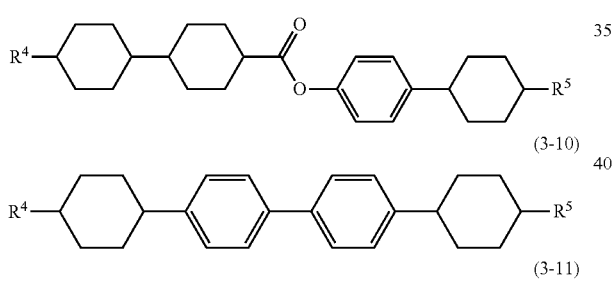
(3-9)

(3-10)

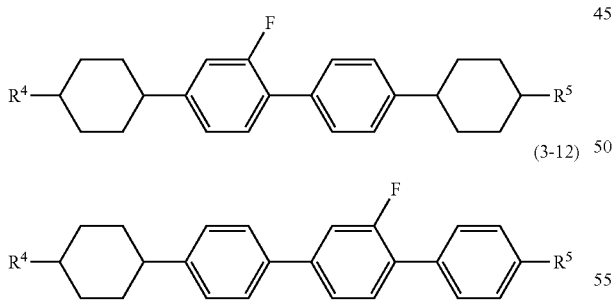
(3-11)

(3-12)

wherein in formulas (3-1) to (3-12), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen is replaced by halogen.

Item 6 is the liquid crystal composition of item 4 or 5 in which the proportion of the third component is in the range of 5 wt % to 70 wt % based on the weight of the liquid crystal composition.

Item 7 is the liquid crystal composition of any one of items 1 to 6 which further contains at least one compound selected from the group of compounds represented by formula (4) as a fourth component:

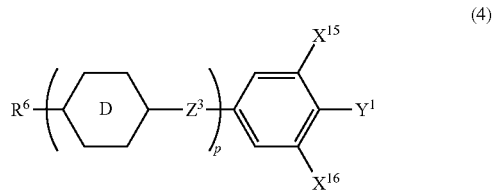
(4)

wherein in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{15}$ and $X^{16}$ are independently hydrogen or fluorine; $Y^1$ is fluorine, chlorine, alkyl having 1 to 12 carbons in which at least one hydrogen is replaced by halogen, alkoxy having 1 to 12 carbons in which at least one hydrogen is replaced by halogen, or alkenyloxy having 2 to 12 carbons in which at least one hydrogen is replaced by halogen; and p is 1, 2, 3 or 4.

Item 8 is the liquid crystal composition of any one of items 1 to 7 which contains at least one compound selected from the group of compounds represented by formulas (4-1) to (4-34) as the fourth component:

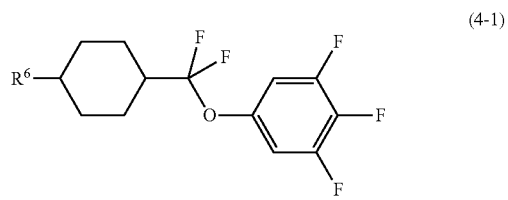
(4-1)

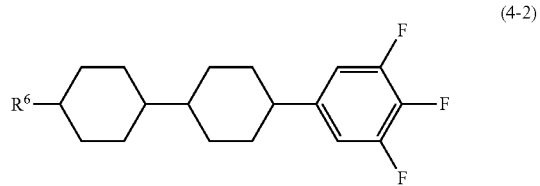
(4-2)

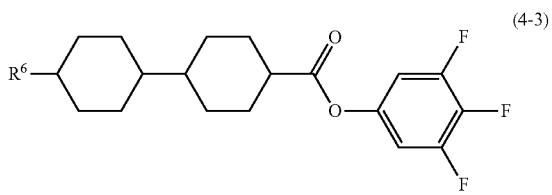
(4-3)

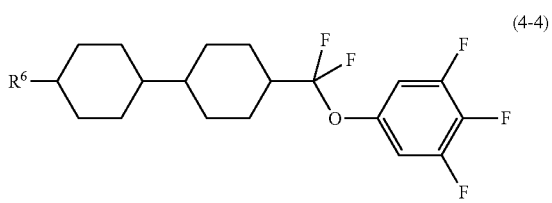
(4-4)

(4-5)
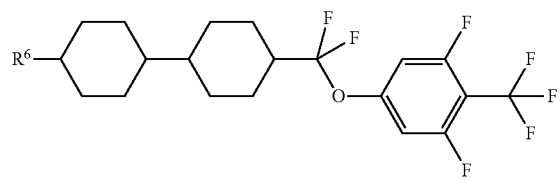
(4-6)
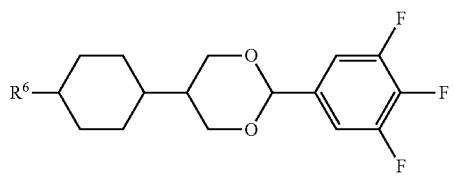
(4-7)
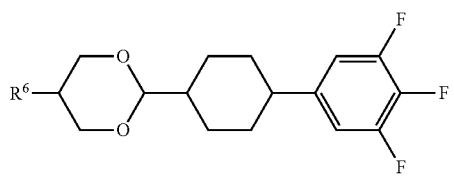
(4-8)
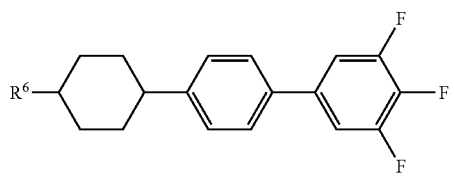
(4-9)
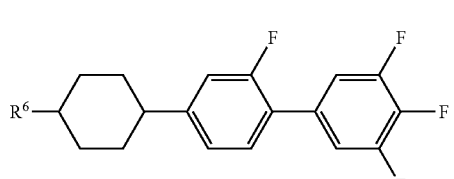
(4-10)
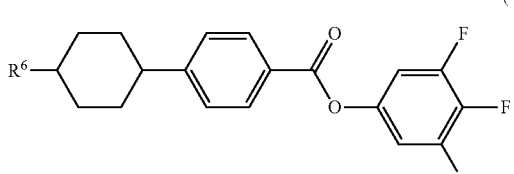
(4-11)
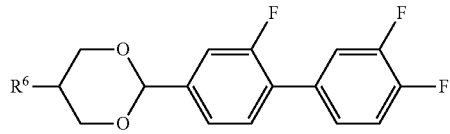
(4-12)
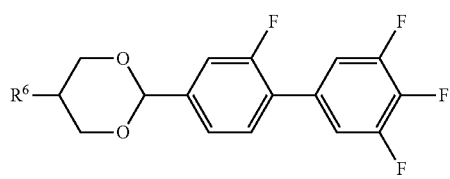
(4-13)
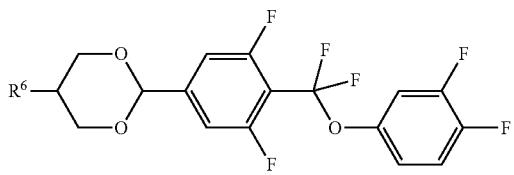
(4-14)
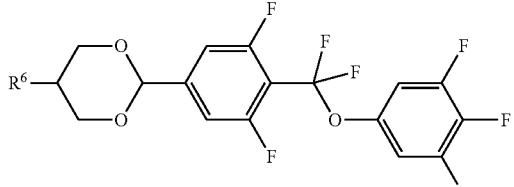
(4-15)
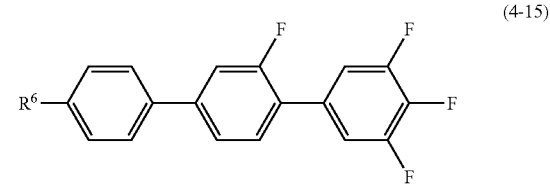
(4-16)
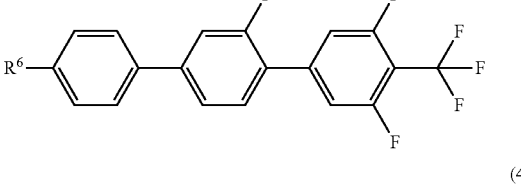
(4-17)
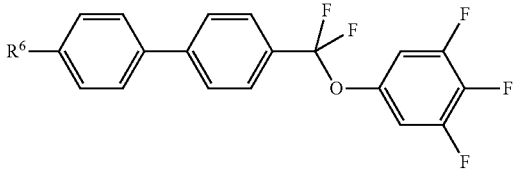
(4-18)
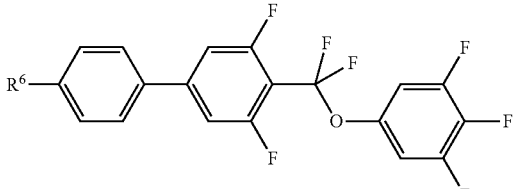
(4-19)
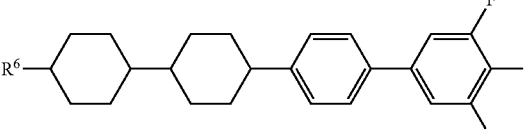
(4-20)

(4-21)
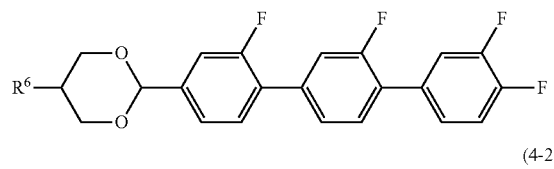

(4-22)
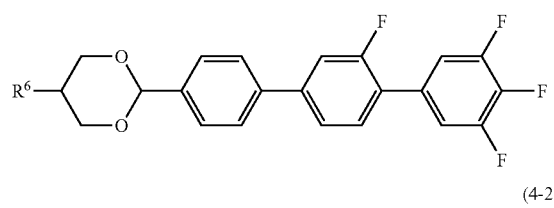

(4-23)
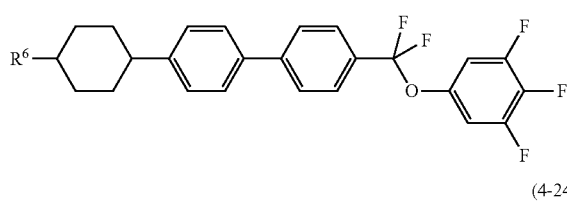

(4-24)
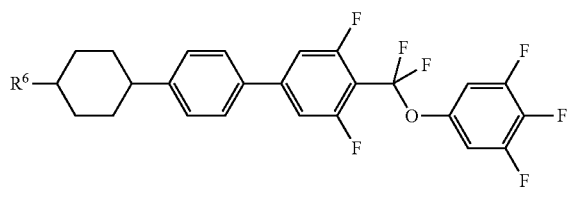

(4-25)
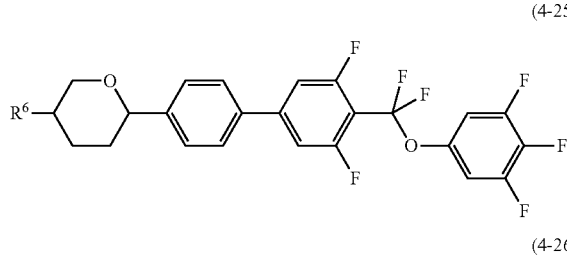

(4-26)
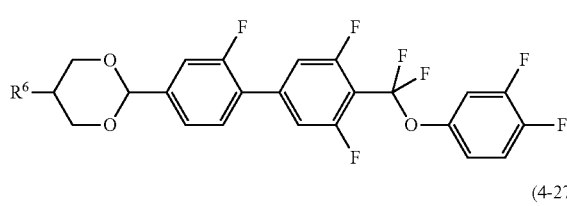

(4-27)
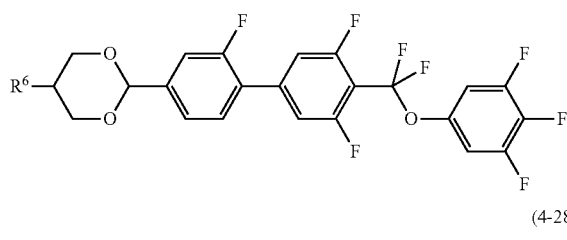

(4-28)
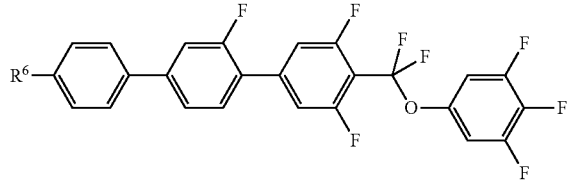

(4-29)
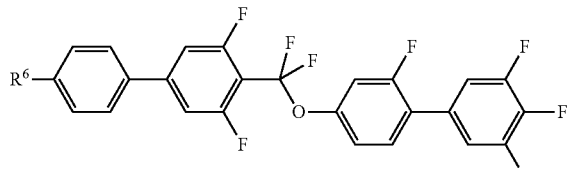

(4-30)
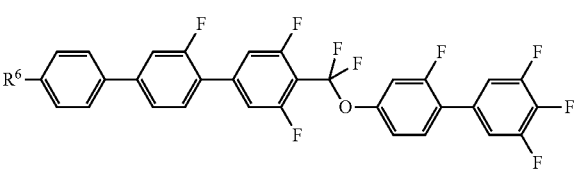

(4-31)
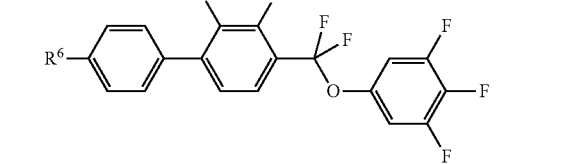

(4-32)
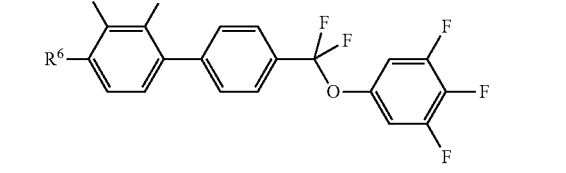

(4-33)
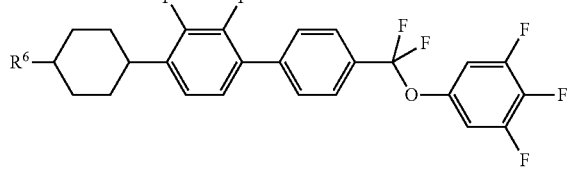

(4-34)
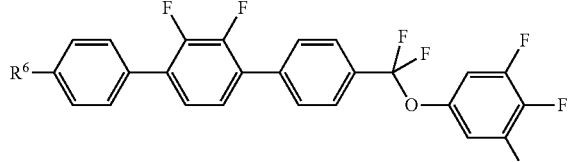

wherein in formulas (4-1) to (4-34), $R^6$ is alkyl having 1 to 12 carbons, alkoxy having 1 to 12 carbons or alkenyl having 2 to 12 carbons.

Item 9 is the liquid crystal composition of item 7 or 8 in which the proportion of the fourth component is in the range of 3 wt % to 40 wt % based on the weight of the liquid crystal composition.

Item 10 is the liquid crystal composition of any one of items 1 to 9 which contains at least one compound selected from the group of compounds represented by formula (5) as a fifth component:

(5)

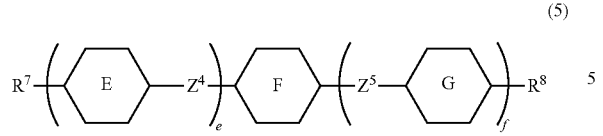

wherein in formula (5), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring E and ring G are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; e is 1, 2 or 3, and f is 0 or 1; and e+f is 3 or less.

Item 11 is the liquid crystal composition of any one of items 1 to 10 which contains at least one compound selected from the group of compounds represented by formulas (5-1) to (5-19) as the fifth component:

(5-1)
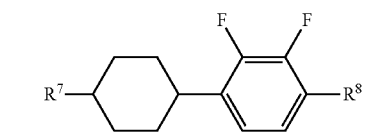

(5-2)
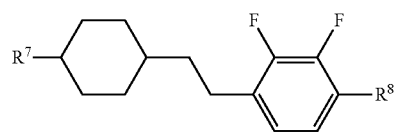

(5-3)
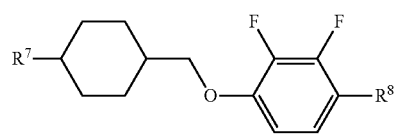

(5-4)
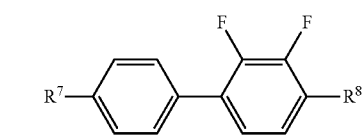

(5-5)
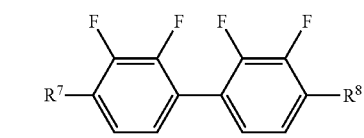

(5-6)
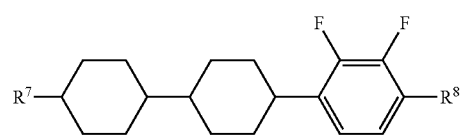

(5-7)
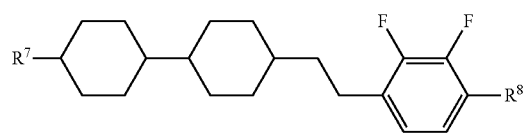

(5-8)
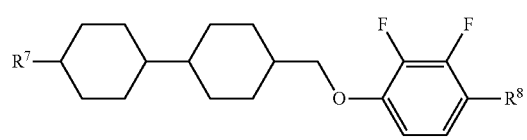

(5-9)
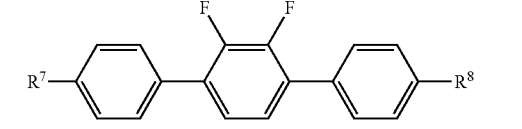

(5-10)
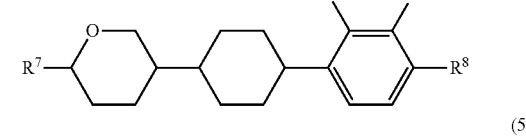

(5-11)
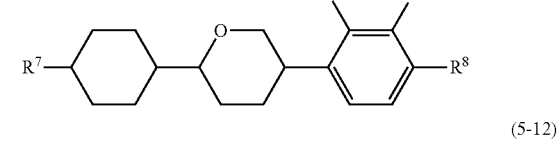

(5-12)
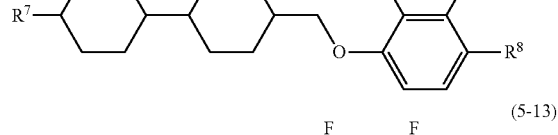

(5-13)
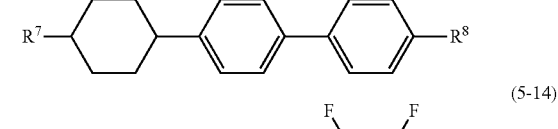

(5-14)
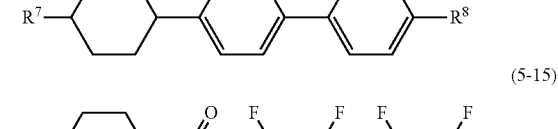

(5-15)
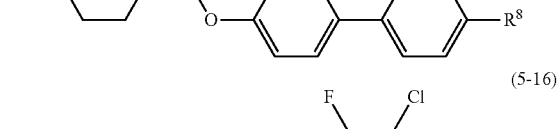

(5-16)
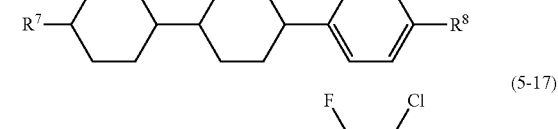

(5-17)
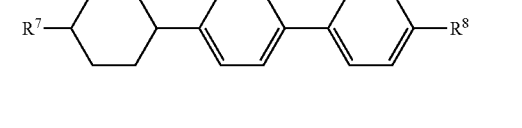

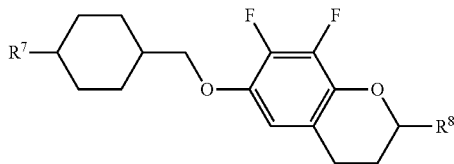

(5-18)

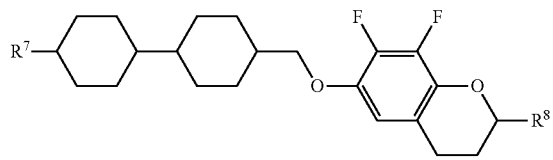

(5-19)

wherein in formulas (5-1) to (5-19), R⁷ and R⁸ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen.

Item 12 is the liquid crystal composition of item 10 or 11 in which the proportion of the fifth component is in the range of 3 wt % to 25 wt % based on the weight of the liquid crystal composition.

Item 13 is the liquid crystal composition of any one of items 1 to 12 of which the maximum temperature of nematic phase is 70° C. or higher, the optical anisotropy (measured at 25° C.) at a wavelength of 589 nm is 0.07 or more, and the dielectric anisotropy (measured at 25° C.) at a frequency of 1 kHz is 2 or more.

Item 14 is a liquid crystal display device including the liquid crystal composition of any one of items 1 to 13.

Item 15 is the LCD device of item 14 of which the operating mode is a TN mode, an ECB mode, an OCB mode, an IPS mode, an FFS mode or an FPA mode, and the driving mode is an active matrix mode.

Item 16 is use of the liquid crystal composition of any one of items 1 to 13 in a liquid crystal display device.

The invention further includes the following items: a) the composition which further contains at least one of additives such as an optically active compound, an antioxidant, a UV light absorbent, a dye, an antifoaming agent, a polymerizable compound, a polymerization initiator and a polymerization inhibitor; b) an AM device including the composition; c) the composition which further contains a polymerizable compound, and an AM device of a polymer sustained alignment (PSA) mode including the composition; d) an AM device of a PSA mode including the composition in which the polymerizable compound in the composition has been polymerized; e) a device that includes the composition and has a PC, TN, STN, ECB, OCB, IPS, VA, FFS or FPA mode; f) a transmissive device including the composition; g) use of the composition as a composition having a nematic phase; and h) use of the composition as an optically active composition by adding an optically active compound to the composition.

The composition of the invention will be described in the following order. First, the constitution of the component compounds in the composition is described. Second, main characteristics of the component compounds and main effects of the compounds on the composition are described. Third, the combination of the components in the composition, preferred proportions of the components and the bases thereof are described. Fourth, preferred embodiments of the component compounds are described. Fifth, preferred component compounds are described. Sixth, additives that may be added to the composition are described. Seventh, methods for synthesizing the component compounds are described. Last, the application of the composition is described.

First, the constitution of the component compounds in the composition are described. The compositions of the invention are classified into composition A and composition B. Composition A may further contain other liquid crystal compound, an additive or the like in addition to the liquid crystal compound selected from compounds (1), (2), (3), (4) and (5). "Other liquid crystal compound" means a liquid crystal compound different from compounds (1), (2), (3), (4) and (5). Such a compound is mixed with the composition for further adjusting the characteristics. Examples of the additive includes an optically active compound, an antioxidant, a UV light absorbent, a dye, an antifoaming agent, a polymerizable compound, a polymerization initiator and a polymerization inhibitor.

Composition B consists essentially of liquid crystal compounds selected from the group consisting of compounds (1), (2), (3), (4) and (5). The term "essentially" means that the composition may contain an additive, but does not contain any other liquid crystal compound. Composition B has a smaller number of components than composition A has. Composition B is preferred to composition A in view of cost reduction. Composition A is preferred to composition B in view of possibility of further adjusting the characteristics by mixing other liquid crystal compound.

Second, the main characteristics of the component compounds and the main effects of the compounds on the characteristics of the composition are described. The main characteristics of the component compounds are summarized in Table 2 on the basis of the advantageous effects of the invention. In Table 2, the symbol "L" stands for "large" or "high," "M" stands for "medium," and "S" stands for "small" or "low." The symbols L, M and S represent classification based on a qualitative comparison among the component compounds, and 0 (zero) means "the value is nearly zero."

TABLE 2

| Characteristics of Compounds | | | | | |
|---|---|---|---|---|---|
| Compounds | (1) | (2) | (3) | (4) | (5) |
| Maximum temperature | S to L | M | S to L | S to L | S to M |
| Viscosity | M to L | S | S to M | M to L | M |
| Optical anisotropy | M to L | S | M to L | M to L | M to L |
| Dielectric anisotropy | M to L | 0 | 0 | S to L | M to L[1)] |
| Specific resistance | L | L | L | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) increases the dielectric anisotropy. Compound (2) decreases the viscosity. Compound (3) increases the maximum temperature or decreases the minimum temperature. Compound (4) decreases the minimum temperature and increases the dielectric anisotropy. Compound (5) increases a dielectric constant in a minor axis direction.

Third, the combination of the components in the composition, the preferred proportions of the component compounds and the bases thereof are described. The combination of the components in the composition is a combination of the first component and the second component, a combination of the first component, the second component and the third component, a combination of the first component, the second component and the fourth component, a combination of the first component, the second component, the third component and the fourth component, a combination of the first component, the second component and the fifth component, a combination of the first component, the second component, the third component and the fifth component, a combination of the first component, the second component, the fourth component and the fifth component, or a combination of the first component, the second component, the third component, the fourth component and the fifth component. A preferred combination of the components in the composition is the combination of the first component, the second component and the third component, or the combination of the first, the second, the third and the fourth components.

A preferred proportion of the first component is about 5 wt % or more for increasing the dielectric anisotropy, and about 40 wt % or less for decreasing the minimum temperature or decreasing the viscosity. A further preferred proportion is in the range of about 5 wt % to about 35 wt %. A particularly preferred proportion is in the range of about 10 wt % to about 30 wt %.

A preferred proportion of the second component is about 5 wt % or more for decreasing the viscosity, and about 60% or less for increasing the dielectric anisotropy. A further preferred proportion is in the range of about 10 wt % to about 55 wt %. A particularly preferred proportion is in the range of about 20 wt % to about 50 wt %.

A preferred proportion of the third component is about 5 wt % or more for increasing the maximum temperature or decreasing the viscosity, and about 70% or less for increasing the dielectric anisotropy. A further preferred proportion is in the range of about 10 wt % to about 60 wt %. A particularly preferred proportion is in the range of about 15 wt % to about 50 wt %.

A preferred proportion of the fourth component is about 3 wt % or more for increasing the dielectric anisotropy, and about 40 wt % or less for decreasing the minimum temperature. A further preferred proportion is in the range of about 5 wt % to about 35 wt %. A particularly preferred proportion is in the range of about 10 wt % to about 30 wt %.

A preferred proportion of the fifth component is about 3 wt % or more for increasing the dielectric anisotropy, and about 25 wt % or less for decreasing the minimum temperature. A further preferred proportion is in the range of about 5 wt % to about 20 wt %. A particularly preferred proportion is in the range of about 5 wt % to about 15 wt %.

Fourth, preferred embodiment of the component compounds are described. $R^1$ and $R^6$ are independently alkyl having 1 to 12 carbons, alkoxy having 1 to 12 carbons or alkenyl having 2 to 12 carbons. Preferred $R^1$ or $R^6$ is alkyl having 1 to 12 carbons for increasing the stability to UV light or heat. $R^2$ is alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen. Preferred $R^2$ is alkyl having 1 to 12 carbons for increasing the stability to UV light or heat, or the like, or alkenyl having 2 to 12 carbons for decreasing the minimum temperature or decreasing the viscosity. $R^3$ is alkenyl having 2 to 12 carbons, or alkenyl having 2 to 12 carbons in which at least one hydrogen is replaced by halogen. $R^4$ and $R^5$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen. Preferred $R^4$ or $R^5$ is alkyl having 1 to 12 carbons for increasing the stability to UV light or heat, or the like, or alkenyl having 2 to 12 carbons for decreasing the minimum temperature or decreasing the viscosity. $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen. Preferred $R^7$ or $R^8$ is alkyl having 1 to 12 carbons for increasing the stability, or alkoxy having 1 to 12 carbons for increasing the dielectric anisotropy. Preferred halogen is fluorine or chlorine, and further preferred halogen is fluorine.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. The preferred configuration of —CH=CH— in an alkenyl depends on the position of the double bond. Trans is preferred in alkenyl groups such as 1-propenyl, 1-butenyl, 1-pentenyl, 1-hexenyl, 3-pentenyl and 3-hexenyl, for decreasing the viscosity, for instance. Cis is preferred in alkenyl groups such as 2-butenyl, 2-pentenyl and 2-hexenyl. Among the alkenyl groups, straight alkenyl is preferred to branched alkenyl.

Preferred examples of alkenyl in which at least one hydrogen is replaced by halogen include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples include 2,2-difluorovinyl and 4,4-difluoro-3-butenyl for decreasing the viscosity.

j is 1, 2, 3 or 4. Preferred j is 2 for decreasing the minimum temperature, or 3 for increasing the dielectric anisotropy. n is 1, 2 or 3. Preferred n is 2 for decreasing the minimum temperature. p is 1, 2, 3 or 4. Preferred p is 2 for decreasing the minimum temperature, or 3 for increasing the dielectric anisotropy. e is 1, 2 or 3, f is 0 or 1, and the sum of e and f is 3 or less. Preferred e is 1 for decreasing the viscosity, or is 2 or 3 for increasing the maximum temperature. Preferred f is 0 for decreasing the viscosity, or is 1 for decreasing the minimum temperature.

$Z^1$ is a single bond, ethylene, vinylene, methyleneoxy, carbonyloxy or difluoromethyleneoxy. Preferred $Z^1$ is a single bond for decreasing the viscosity, or is difluoromethyleneoxy for increasing the dielectric anisotropy ($\Delta\in$). $Z^2$ is a single bond, ethylene or carbonyloxy. Preferred $Z^2$ is a single bond for decreasing the viscosity. $Z^3$ is a single bond, ethylene, carbonyloxy or difluoromethyleneoxy. Preferred $Z^3$ is difluoromethyleneoxy for increasing $\Delta\in$. $Z^4$ and $Z^5$ are independently a single bond, ethylene, carbonyloxy or methyleneoxy. Preferred $Z^4$ or $Z^5$ is a single bond for decreasing the viscosity, or is methyleneoxy for increasing $\Delta\in$.

Ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, tetrahydropyran-2,5-diyl or naphthalene-2,6-diyl. Preferred ring A is 1,4-phenylene or 2-fluoro-1,4-phenylene for increasing the optical anisotropy. Ring B and ring C are independently 1,4-cyclohexylene, 1,4-phenylene, 2-fluoro-1,4-phenylene or 2,5-difluoro-1,4-phenylene, and when n is 1, ring C is 1,4-phenylene. Preferred ring B or ring C is 1,4-cyclohexylene for decreasing viscosity, or is 1,4-phenylene for increasing the optical anisotropy (Δn). Ring D is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring D is 1,4-phenylene or 2-fluoro-1,4-phenylene for increasing Δn. Ring E and ring G are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl. Preferred examples of "1,4-phenylene in which at least one hydrogen is replaced by fluorine or chlorine" include 2-fluoro-1,4-phenylene, 2,3-difluoro-1,4-phenylene and 2-chloro-3-fluoro-1,4-phenylene. Preferred ring E or ring G is 1,4-cyclohexylene for decreasing the viscosity, or is tetrahydropyran-2,5-diyl for increasing Δ∈, or is 1,4-phenylene for increasing Δn. Ring F is 2,3-difluoro-1,4-phenylene, 2-chloro-3-fluoro-1,4-phenylene, 2,3-difluoro-5-methyl-1,4-phenylene, 3,4,5-trifluoronaphthalen-2,6-diyl or 7,8-difluorochroman-2,6-diyl. Preferred ring F is 2,3-difluoro-1,4-phenylene for increasing Δ∈. With regard to the configuration of 1,4-cyclohexylene, trans is preferred to cis for increasing the maximum temperature. Tetrahydropyran-2,5-diyl may be

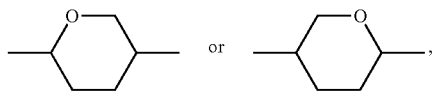

and is preferably

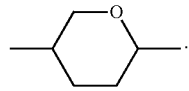

$X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$ and $X^{16}$ are independently hydrogen or fluorine. Preferred $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$ or $X^{16}$ is fluorine for increasing the dielectric anisotropy.

$Y^1$ is fluorine, chlorine, alkyl having 1 to 12 carbons in which at least one hydrogen is replaced by halogen, alkoxy having 1 to 12 carbons in which at least one hydrogen is replaced by halogen, or alkenyloxy having 2 to 12 carbons in which at least one hydrogen is replaced by halogen. Preferred $Y^1$ is fluorine for decreasing the minimum temperature.

Fifth, the preferred component compounds are described. Preferred compounds (1) include compounds (1-1) to (1-14) as described in item 2. It is preferred that at least one compound in the first component is compound (1-2), (1-3), (1-4), (1-6), (1-7), (1-8), (1-9), (1-10), (1-13) or (1-14) among these compounds. It is also preferred that at least two compounds in the first component include a combination of compounds (1-3) and (1-8), a combination of compounds (1-4) and (1-9), a combination of compounds (1-6) and (1-9), or a combination of compounds (1-13) and (1-14).

Preferred compounds (3) include compounds (3-1) to (3-12) as described in item 5. It is preferred that at least one compound in the third component is compound (3-2), (3-4), (3-5), (3-6), (3-9) or (3-12) among these compounds. It is also preferred that at least two compounds in the third component include a combination of compounds (3-2) and (3-4), a combination of compounds (3-2) and (3-5), or a combination of compounds (3-2) and (3-6).

Preferred compounds (4) include compounds (4-1) to (4-34) as described in item 8. It is preferred that at least one compound in the fourth component is compound (4-4), (4-12), (4-14), (4-15), (4-17), (4-18), (4-23), (4-27), (4-28) or (4-29) among these compounds. It is also preferred that at least two compounds in the fourth component include a combination of compounds (4-12) and (4-15), a combination of compounds (4-14) and (4-27), a combination of compounds (4-18) and (4-24), a combination of compounds (4-18) and (4-28), a combination of compounds (4-24) and (4-28), or a combination of compounds (4-28) and (4-29).

Preferred compounds (5) include compounds (5-1) to (5-19) as described in item 11. It is preferred that at least one compound in the fifth component is compound (5-1), (5-3), (5-4), (5-6), (5-8) or (5-13) among them. It is also preferred that at least two compounds in the fifth component include a combination of compounds (5-1) and (5-6), a combination of compounds (5-1) and (5-13), a combination of compounds (5-3) and (5-6), a combination of compounds (5-3) and (5-13), a combination of compounds (5-4) and (5-6), or a combination of compounds (5-4) and (5-8).

Sixth, the additives that may be added to the composition are described. Such additives include an optically active compound, an antioxidant, a UV light absorbent, a dye, an antifoaming agent, a polymerizable compound, a polymerization initiator and a polymerization inhibitor. The optically active compound is added to the composition for inducing a helical structure and giving a twist angle in liquid crystals. Examples of such a compound include compounds (6-1) to (6-5). A preferred proportion of the optically active compound is about 5 wt % or less. A further preferred proportion is in the range of about 0.01 wt % to about 2 wt %.

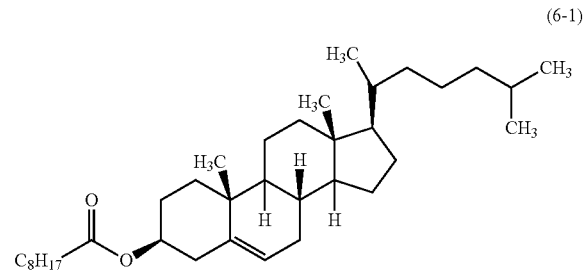

(6-1)

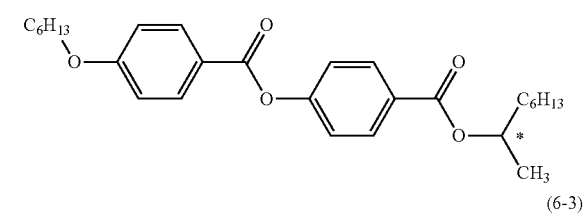

(6-2)

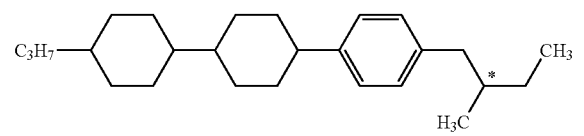

(6-3)

(6-4)
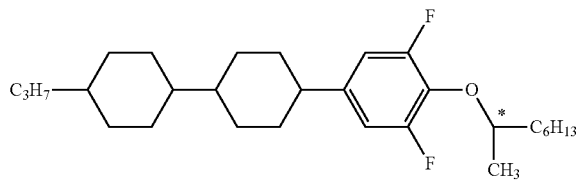

(6-5)
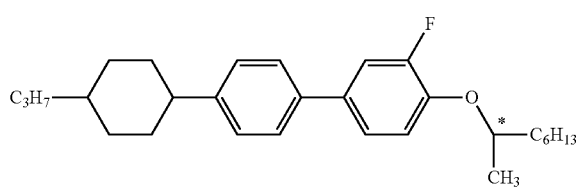

The antioxidant is added to the composition for preventing a decrease in the specific resistance caused by heating in air, or maintaining a large voltage holding ratio at room temperature and also at a temperature close to the maximum temperature even after the device has been used for a long period of time. Preferred examples of the antioxidant include compound (7), wherein t is an integer from 1 to 9.

(7)
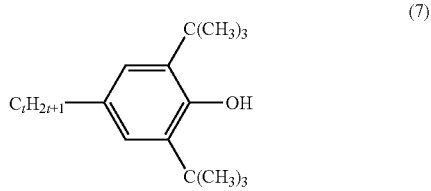

For compound (7), preferred t is 1, 3, 5, 7 or 9, and further preferred t is 7. Compound (7) of t=7 is effective in maintaining a large voltage holding ratio at room temperature and also at a temperature close to the maximum temperature even after the device has been used for a long period of time, as having a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

Preferred examples of the UV light absorbent include a benzophenone derivative, a benzoate derivative and a triazole derivative. A light stabilizer such as an amine having steric hindrance is also preferred. A preferred proportion of the UV light absorbent or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is added to the composition to be adapted for a device of a guest host (GH) mode. A preferred proportion of the dye is in the range of about 0.01 wt % to about 10 wt %. The antifoaming agent such as dimethyl silicone oil or methyl phenyl silicone oil is added to the composition for preventing foam formation. A preferred proportion of the antifoaming agent is about 1 ppm or more for achieving the effect thereof, and about 1,000 ppm or less for avoiding a poor display. A further preferred proportion is in the range of about 1 ppm to about 500 ppm.

The polymerizable compound is added to the composition to be adapted to a device of a polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. More preferred examples include an acrylate derivative or a methacrylate derivative. A preferred proportion of the polymerizable compound is about 0.05 wt % or more for achieving the effect thereof, and about 10 wt % or less for avoiding a poor display. A more preferred proportion is in the range of about 0.1 wt % to about 2 wt %. The polymerizable compound is polymerized by irradiation with UV light. The polymerizable compound may be polymerized in the presence of an initiator such as a photo-polymerization initiator. Suitable conditions for polymerization, suitable types of the initiator and suitable amounts thereof are known to those of ordinary skill in the art and are described in literature. For example, Irgacure 651™ (BASF), Irgacure 184™ (BASF) or Darocure 1173™ (BASF), each being a photo-initiator, is suitable for radical polymerization. A preferred proportion of the photo-polymerization initiator is in the range of about 0.1 wt % to about 5 wt % based on the weight of the polymerizable compound. A further preferred proportion is in the range of about 1 wt % to about 3 wt % based on the same.

When the polymerizable compound is stored, a polymerization inhibitor may be added for avoiding polymerization. The polymerizable compound is often added to the composition while the polymerization inhibitor is not removed. Specific examples of the polymerization inhibitor include hydroquinone, a hydroquinone derivative such as methylhydroquinone, 4-tert-butylcatechol, 4-methoxyphenol and phenothiazine.

Seventh, methods for synthesizing the component compounds are described. The compounds can be prepared with known methods. Examples of the synthetic methods will be described. Compound (2) may be prepared by the method disclosed in JP S59-176221 A. Compound (3-12) may be prepared by the method described in JP H2-237949 A. Compound (4-2) and compound (4-8) may be prepared by the method described in JP H2-233626 A. Compound (5-1) and compound (5-6) may be prepared by the method described in JP H2-503441 A. The antioxidant is commercially available. A compound represented by formula (7) of t=1 is available from Sigma-Aldrich Corporation. Compound (7) of t=7 and so on are prepared by the method described in U.S. Pat. No. 3,660,505 B. As compound (1-14), for example, compound (1-14-1) may be prepared by the method described below.

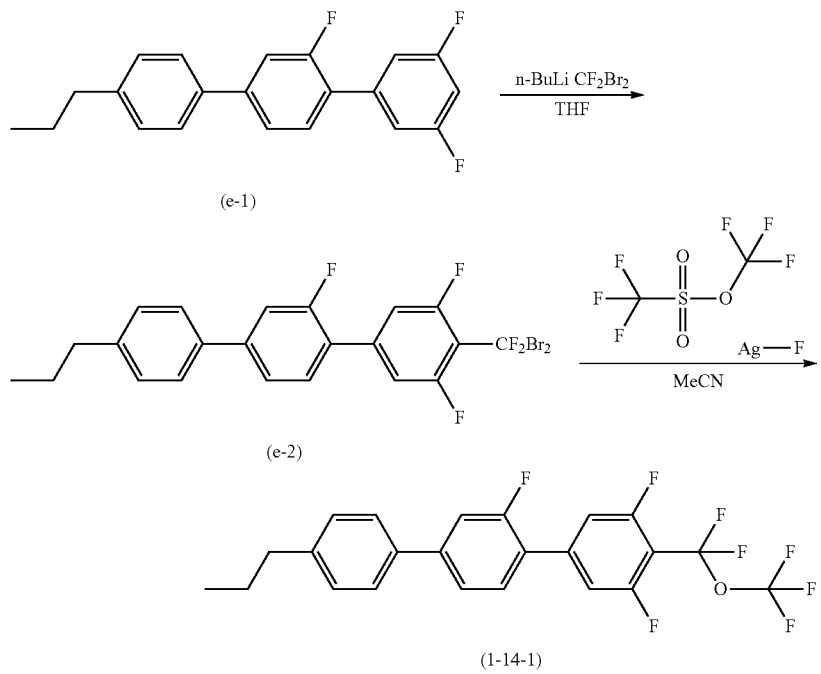

First Step:

In an $N_2$-atmosphere, 30.0 g of compound (e-1) and 180 mL of THF were put in a reaction vessel, and the resulting mixture was cooled to −74° C. Thereto, 68.9 mL of a 1.6 M n-hexane solution of n-butyllithium was added dropwise in the temperature range of −74° C. to −70° C., and the resulting mixture was further stirred for 60 min. Subsequently, a 20.0 mL THF solution of 28.9 g of dibromodifluoromethane was added dropwise thereto in the temperature range of −75° C. to −70° C., and the resulting mixture was stirred for 60 min while the temperature was returned to 25° C. The resulting reaction mixture was poured into ice water and the aqueous layer was extracted with toluene. A combined organic layer was washed with brine and dried over anhydrous magnesium sulfate. The solution was concentrated under a reduced pressure, and the residue was purified by silica gel chromatography (heptane) to give 27.9 g of compound (e-2) (66.7%). In addition, compound (e-1) can be prepared by the method described in JP 2007-308483 A or the like.

Second Step:

In an $N_2$-atmosphere, 8.00 g of compound (e-2), 8.92 g of silver fluoride and 400 mL of acetonitrile were put in a reaction vessel, and the resulting mixture was cooled to −30° C. Thereto, 17.91 mL of TFMT was added, the vessel was sealed, and the resultant was stirred for two days. The resulting reaction mixture was poured into water and the aqueous layer was extracted with toluene three times. The combined organic layer was washed with brine and dried over anhydrous magnesium sulfate. The solution was concentrated under a reduced pressure, and the residue was purified by silica gel chromatography (heptane) to give 2.2 g of compound (1-14-1) (27.2%).

$^1$H-NMR (δ ppm; $CDCl_3$): 7.53 (d, 2H), 7.48 (d, 2H), 7.42 (d, 1H), 7.30 (d, 2H), 7.26 (d, 2H), 2.65 (t, 2H), 1.69 (sex, 2H), 0.98 (t, 3H).

Any compounds whose synthetic methods are not described above can be prepared with the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared with publicly known methods using the thus obtained compounds. For example, the component compounds are mixed and dissolved in each other by heating.

Last, the application of the composition is described. The composition of the invention mainly has a minimum temperature of about −10° C. or lower, a maximum temperature of about 70° C. or higher, and an optical anisotropy in the range of about 0.07 to about 0.20. The device including the composition has a large voltage holding ratio. The composition is suitable for use in an AM device. The composition is particularly suitable for use in a transmissive AM device. The composition having an optical anisotropy in the range of about 0.08 to about 0.25, and also the composition having an optical anisotropy in the range of about 0.10 to about 0.30 may be prepared by controlling the ratio of the component compounds or by mixing with other liquid crystal compound. The composition can be used as a composition having a nematic phase, or as an optically active composition by adding an optically active compound.

The composition can be used for an AM device. The composition can also be used for a PM device. The composition can also be used for an AM device and a PM device having a mode such as PC, TN, STN, ECB, OCB, IPS, FFS, VA or FPA. Use for an AM device having a TN, OCB, IPS or FFS mode is particularly preferred. In an AM device of the IPS or FFS mode, when a voltage is not applied, alignment of liquid crystal molecules may be parallel or perpendicular to the glass substrate. The device may be of a reflective type, a transmissive type or a transreflective type. Use for the transmissive device is preferred. The composition can also be used for an amorphous silicon-TFT device or a polycrystal silicon-TFT device. The composition can also be used for a device of a nematic curvilinear aligned phase (NCAP) mode prepared by microencapsulating the composition, and for a device of a polymer dispersed (PD) mode in which a three-dimensional network-polymer is formed in the composition.

The following examples are for illustrative purposes only and are not intended, nor should they be interpreted to, limit the scope of the invention.

EXAMPLES

A prepared compound was identified by a method such as an NMR analysis. Characteristics of a compound or composition were measured by the methods below.

NMR analysis: DRX-500 made by Bruker BioSpin Corporation was used for the measurement. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. $^{19}$F-NMR measurement was carried out using $CFCl_3$ as an internal standard, with 24 times of accumulation. In the explanation of NMR spectra, symbols s, d, t, q, quin, sex, m and br stand for a singlet, a doublet, a triplet, a quartet, a quintet, a sextet, a multiplet and a broad peak, respectively.

Gas Chromatographic Analysis: GC-14B Gas Chromatograph made by Shimadzu Corporation was used for the measurement. A carrier gas was helium (2 mL/min). The sample injector and the detector (FID) were set to 280° C. and 300° C., respectively. A capillary column DB-1 (length: 30 m, bore: 0.32 mm, film thickness: 0.25 μm; dimethylpolysiloxane as the stationary phase, non-polar) made by Agilent Technologies, Inc. was used for separating component compounds. After the column was kept at 200° C. for 2 min, it was heated to 280° C. at a rate of 5° C./min. A sample was prepared in an acetone solution (0.1 wt %), and 1 μL of the solution was injected into the sample injector. The recorder was C-R5A Chromatopac made by Shimadzu Corporation or its equivalent. The resulting gas chromatogram showed a retention time of a peak and a peak area corresponding to each of the component compounds.

As a solvent for diluting the sample, chloroform, hexane and so forth may also be used. The following capillary columns may also be used for separating component compounds: HP-1 (length: 30 m, bore: 0.32 mm, film thickness: 0.25 μm) made by Agilent Technologies, Inc., Rtx-1 (length: 30 m, bore: 0.32 mm, film thickness: 0.25 μm) made by Restek Corporation and BP-1 (length: 30 m, bore: 0.32 mm, film thickness: 0.25 μm) made by SGE International Pty. Ltd. A capillary column CBP1-M50-025 (length: 50 m, bore: 0.25 mm, film thickness: 0.25 μm) made by Shimadzu Corporation may also be used for avoiding an overlap of peaks of the compounds.

The proportion of the liquid crystal compounds contained in the composition may be calculated by the method described below. A mixture of the liquid crystal compounds is detected by a gas chromatograph (FID). The ratio of peak areas in a gas chromatogram corresponds to a ratio (weight ratio) of the liquid crystal compounds. When the capillary column described above was used, the correction coefficient of each of the liquid crystal compounds may be regarded as one. Thus, the proportions (wt %) of the liquid crystal compounds can be calculated from the ratio of the peak areas.

Measurement sample: When characteristics of a composition were to be measured, the composition was used as a sample as was. When characteristics of a compound were to be measured, a sample for measurement was prepared by mixing the compound (15 wt %) into a base liquid crystal (85 wt %). Values of characteristics of the compound were calculated with an extrapolation method using the values obtained by the measurement: (extrapolated value)={(measured value of a sample)−0.85×(measured value of base liquid crystal)}/0.15. When a smectic phase (or crystals) precipitated at the ratio thereof at 25° C., the ratio of the compound to the base liquid crystal was changed step by step in the order of (10 wt %:90 wt %), (5 wt %:95 wt %) and (1 wt %:99 wt %). The values of the maximum temperature, optical anisotropy, viscosity and dielectric anisotropy with regard to the compound were determined with the extrapolation method.

Base liquid crystal described below was used. The proportion of each component compound was expressed in terms of "wt %."

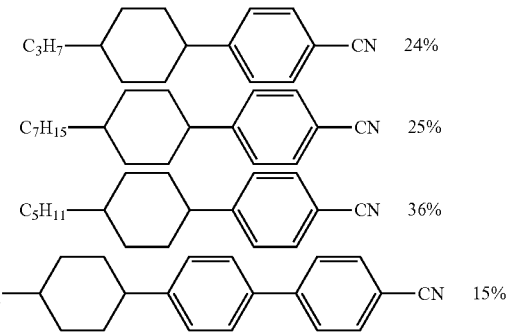

Measuring method: Characteristics were measured with the methods described below. Most of the methods are applied as described in the standard "JEITA ED-2521B" that was discussed and established by Japan Electronics and Information Technology Industries Association (JEITA), or as modified thereon. No Thin-Film Transistor (TFT) was attached to a TN device used for the measurement.

1) Maximum temperature of nematic phase (NI; ° C.): A sample was placed on a hot plate in a melting point apparatus equipped with a polarizing microscope and was heated at a rate of 1° C./min. The temperature at which a part of the sample began to change from a nematic phase to an isotropic liquid was measured.

2) Minimum temperature of a nematic phase ($T_c$; ° C.): Samples each having a nematic phase were put in glass vials and kept in freezers at temperatures of 0° C., −10° C., −20° C., −30° C. and −40° C., respectively, for 10 days, and then liquid crystal phases were observed. For example, when a sample maintained the nematic phase at −20° C. and changed to crystals or a smectic phase at −30° C., $T_c$ was expressed as "$T_c$<−20° C."

3) Viscosity (bulk viscosity; η; measured at 20° C.; mPa·s): A cone-plate (E type) rotational viscometer made by Tokyo Keiki Inc. was used for the measurement.

4) Viscosity (rotational viscosity; γ1; measured at 25° C.; mPa·s): Measurement was carried out with the method described in M. Imai et al., *Molecular Crystals and Liquid Crystals*, Vol. 259, 37 (1995). A sample was put in a TN device in which the twist angle was 0° and the distance (cell gap) between two glass substrates was 5 μm. A voltage was applied stepwise to the device in the range of 16 V to 19.5 V at an increment of 0.5 V. After a period of 0.2 sec with no voltage, voltage was applied repeatedly under conditions of only one rectangular wave (rectangular pulse; 0.2 sec) and no voltage (2 sec). The peak current and the peak time of a transient current generated by the applied voltage were measured. The value of rotational viscosity was obtained from the measured values and Equation (8) on page 40 of the paper of M. Imai et al. The value of dielectric anisotropy required for the calculation was determined using the device by which the rotational viscosity was measured and by a method described below.

5) Optical anisotropy (refractive index anisotropy; Δn; measured at 25° C.): Measurement was carried out by an Abbe refractometer with a polarizing plate mounted on the ocular, using light at a wavelength of 589 nm. The surface of the main prism was rubbed in one direction, and then a sample was added dropwise onto the main prism. The refractive index $n_{//}$ was measured when the direction of the polarized light was parallel to the direction of rubbing. The refractive index $n_⊥$ was measured when the direction of polarized light was perpendicular to the direction of rubbing. The optical anisotropy value was calculated from the equation "$Δn = n_{//} - n_⊥$."

6) Dielectric anisotropy (Δ∈; measured at 25° C.): A sample was put in a TN device in which the distance (cell gap) between two glass substrates was 9 μm and the twist angle was 80°. Sine waves (10 V, 1 kHz) were applied to the device, and after 2 sec, the dielectric constant $∈_{//}$ in the major axis direction of liquid crystal molecules was measured. Sine waves (0.5 V, 1 kHz) were applied to the device, and after 2 sec, the dielectric constant $∈_⊥$ in the minor axis direction of the liquid crystal molecules was measured. The Δ∈ value was calculated from the equation "$Δ∈ = ∈_{//} - ∈_⊥$."

7) Threshold voltage (Vth; measured at 25° C.; V): An LCD-5100 luminance meter made by Otsula Electronics Co., Ltd. was used for the measurement. The light source was a halogen lamp. A sample was put in a normally white mode TN device in which the distance (cell gap) between two glass substrates was 0.45/Δn (μm) and the twist angle was 80°. A voltage (32 Hz, rectangular waves) to be applied to the device was stepwise increased from 0 V to 10 V at an increment of 0.02 V. On the occasion, the device was irradiated with light from a direction perpendicular thereto, and the amount of the light transmitted through the device was measured. A voltage-transmittance curve was plotted, in which the maximum light amount corresponds to 100% transmittance and the minimum light amount corresponds to 0% transmittance. The threshold voltage was represented by the voltage at 90% transmittance.

8) Voltage holding ratio (VHR-1; measured at 25° C.; %): A TN device used for the measurement had a polyimide alignment film, and the distance (cell gap) between two glass substrates was 5 μm. A sample was put in the device, and then the device was sealed with an UV-curable adhesive. A pulse voltage (60 microseconds at 5 V) was applied to the TN device to charge the device. A decaying voltage was measured for 16.7 milliseconds with a high-speed voltmeter, and area A between the voltage curve and a horizontal axis in a unit cycle was obtained. The voltage holding ratio was defined by the percentage of area A to area B that was an area without decay.

9) Voltage holding ratio (VHR-2; measured at 80° C.; %): A voltage holding ratio was measured in a manner similar to the procedures described above, except that measurement was carried out at 80° C. in place of 25° C. The thus obtained value was expressed in terms of VHR-2.

10) Voltage holding ratio (VHR-3; measured at 25° C.; %): Stability to UV light was evaluated by measuring a voltage holding ratio after a device was irradiated with UV light. A TN device used for the measurement had a poly-imide alignment film and a cell gap of 5 μm. A sample was injected into the device, and then the device was irradiated with light for 20 min. The light source was an ultra high-pressure mercury lamp USH-500D (by Ushio, Inc.), and the distance between the device and the light source was 20 cm. The decaying voltage in 16.7 milliseconds was measured in VHR-3 measurement. A composition having a large VHR-3 has a large stability to UV light. The value of VHR-3 is preferably 90% or more, further preferably, 95% or more.

11) Voltage holding ratio (VHR-4; measured at 25° C.; %): A TN device into which a sample was injected was heated in a constant-temperature bath at 80° C. for 500 hours, and then the stability to heat was evaluated by measuring a voltage holding ratio. The decaying voltage in 16.7 milliseconds was measured in VHR-4 measurement. A composition having a large VHR-4 has a large stability to heat.

12) Response time (τ; measured at 25° C.; ms): An LCD-5100 luminance meter made by Otsuka Electronics Co., Ltd. was used for the measurement. The light source was a halogen lamp. The low-pass filter was set at 5 kHz. A sample was put in a normally white mode TN device in which the distance (cell gap) between two glass substrates was 5.0 μm and the twist angle was 80°. Rectangular waves (60 Hz, 5 V, 0.5 sec) were applied to the device. On the occasion, the device was irradiated with light from a direction perpendicular thereto, and the amount of the light transmitted through the device was measured. The maximum light amount corresponds to 100% transmittance, and the minimum light amount corresponds to 0% transmittance. The rise time ($τ_r$; millisecond) is the time needed for a change from 90% transmittance to 10% transmittance. The fall time ($τ_f$; millisecond) is the time needed for a change from 10% transmittance to 90% transmittance. The response time was represented by a sum of the rise time and the fall time determined as above.

13) Elastic constant (K; measured at 25° C.; pN): HP4284A LCR Meter made by Yokogawa-Hewlett-Packard Co. was used for the measurement. A sample was put in a horizontal alignment device in which the distance (cell gap) between two glass substrates was 20 μm. An electric charge of 0 V to 20 V was applied to the device, and electrostatic capacity and applied voltage were measured. The measured values of the electrostatic capacity (C) and the applied voltage (V) were fitted to Equation (2.98) and Equation (2.101) on page 75 of "*Liquid Crystal Device Handbook*" (Nikkan Kogyo Shimbun, Ltd.) and the values of K11 and K33 were determined from Equation (2.99). Next, K22 was calculated using the previously determined values of K11 and K33 in Formula (3.18) on page 171 thereof. The elastic constant was represented by a mean value of the thus determined K11, K22 and K33.

14) Specific resistance (ρ; measured at 25° C.; Ω·cm): Into a vessel equipped with electrodes, 1.0 mL of a sample was injected. A DC voltage (10 V) was applied to the vessel, and the DC current after 10 sec was measured. The specific resistance was calculated using the equation "(specific resistance)={(voltage)×(electric capacity of a vessel)}/{(direct current)×(dielectric constant of vacuum)}."

15) Helical pitch (P; measured at room temperature; μm): The helical pitch was measured with a wedge method, as described in "*Handbook of Liquid Crystals*," page 196, (issued in 2000, Maruzen Co., Ltd.). A sample was injected into a wedge cell and left to stand at room temperature for 2 hours, and then the gap (d2−d1) between disclination lines was observed by a polarizing microscope (trade name: MM40/60 series, Nikon Corporation). The helical pitch (P)

was calculated with the equation "P=2×(d2−d1)×tan θ," in which θ is the angle of the wedge cell.

16) Dielectric constant in a minor axis direction ($\epsilon_\perp$; measured at 25° C.): A sample was put in a TN device in which the distance (cell gap) between two glass substrates was 9 μm and the twist angle was 80°. Sine waves (0.5 V, 1 kHz) were applied to the device, and after 2 sec, the dielectric constant $\epsilon_\perp$ in the minor axis direction of the liquid crystal molecules was measured.

Compounds in the Examples were expressed using symbols according to definitions in Table 3 below. In Table 3, the configuration of 1,4-cyclohexylene is trans. The parenthesized number next to a symbolized compound corresponds to the number of the compound. The symbol "(-)" means any other liquid crystal compound. The proportion (percentage) of a liquid crystal compound is expressed in terms of weight percentage (wt %) based on the weight of the liquid crystal composition. The values of the characteristics of the composition were summarized in the last part.

TABLE 3

Method for Description of Compounds using Symbols
R—(A$_1$)—Z$_1$— . . . —Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| F—$C_nH_{2n}$— | Fn- |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —$C_nH_{2n}$—CH=CH—$C_mH_{2m+1}$ | -nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |
| —$CF_2OCF_3$ | —XCF3 |

| 3) Bonding Group —$Z_n$— | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |

| 4) Ring Structure —$A_n$— | Symbol |
|---|---|
|  | H |
| 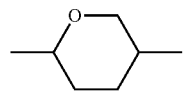 | Dh |
| 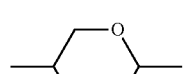 | dh |

TABLE 3-continued

Method for Description of Compounds using Symbols
R—(A$_1$)—Z$_1$— . . . —Z$_n$—(A$_n$)—R'

| | |
|---|---|
|  | B |
| 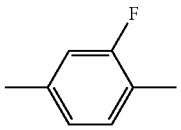 | B(F) |
| 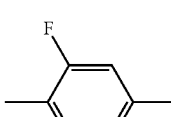 | B(2F) |
| 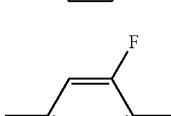 | B(F,F) |
| 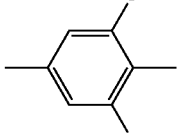 | B(F,F) |
| 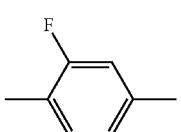 | G |
| 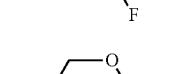 | Py |
| 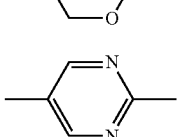 | B(2F,3F) |

5) Examples of Description

Example 1 3-HH-V1

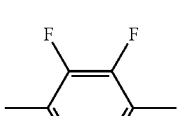

Example 2 3-BB(F)B(F,F)-F

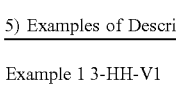

TABLE 3-continued

Method for Description of Compounds using Symbols
R—(A$_1$)—Z$_1$— . . . —Z$_n$—(A$_n$)—R'

Example 3 4-BB(F)B(F,F)XB(F,F)-F

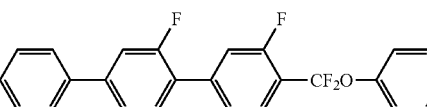

Example 4 5-GB(F,F)XB(F)-XCF3

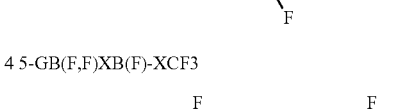

Example 1

| | | |
|---|---|---|
| 3-BB(F,F)XB(F,F)—XCF3 | (1-4) | 10% |
| 4-BB(F)B(F,F)XB(F,F)—XCF3 | (1-9) | 5% |
| 3-BB(F)B(F,F)—XCF3 | (1-14) | 5% |
| 3-HH—V | (2) | 30% |
| 3-HH—V1 | (2) | 10% |
| V2-BB-1 | (3-2) | 8% |
| V—HHB-1 | (3-4) | 10% |
| V2-HHB-1 | (3-4) | 8% |
| V—HBB-2 | (3-5) | 6% |
| 1-BB(F)B-2V | (3-6) | 4% |
| 3-BB(F)B-2V | (3-6) | 4% |

NI = 74.3° C.;
Tc <−20° C.;
Δn = 0.115;
Δε = 3.9;
Vth = 2.10 V;
η = 10.8 mPa · s.

Comparative Example 1

The composition in Example 1 contained compound (1) being a first component. Compound (1) had a positive Δε. Compound (4) also had a positive Δε. For comparison, Comparative Example 1 was executed using a composition in which three compounds being the first component in Example were replaced by compound (4).

| | | |
|---|---|---|
| 3-BB(F,F)XB(F,F)—F | (4-18) | 10% |
| 4-BB(F)B(F,F)XB(F,F)—F | (4-28) | 5% |
| 3-BB(F)B(F,F)—F | (4-15) | 5% |
| 3-HH—V | (2) | 30% |
| 3-HH—V1 | (2) | 10% |
| V2-BB-1 | (3-2) | 8% |
| V—HHB-1 | (3-4) | 10% |
| V2-HHB-1 | (3-4) | 8% |
| V—HBB-2 | (3-5) | 6% |
| 1-BB(F)B-2V | (3-6) | 4% |
| 3-BB(F)B-2V | (3-6) | 4% |

NI = 74.8° C.;
Tc <−20° C.;
Δn = 0.116;
Δε = 2.8;
Vth = 2.35 V;
η = 9.9 mPa · s.

Example 2

| | | |
|---|---|---|
| 3-HXB(F,F)—XCF3 | (1-1) | 4% |
| 3-BB(F,F)XB(F,F)—XCF3 | (1-4) | 5% |
| 3-HBBXB(F,F)—XCF3 | (1-6) | 6% |
| 3-HH—V | (2) | 32% |
| 3-HH—V1 | (2) | 7% |
| 3-HB—O2 | (3-1) | 5% |
| 3-HHEH-3 | (3-3) | 4% |
| 3-HHEH-5 | (3-3) | 4% |
| V—HHB-1 | (3-4) | 7% |
| V2-HHB-1 | (3-4) | 4% |
| 3-HHXB(F,F)—F | (4-4) | 7% |
| 3-HGB(F,F)—F | (4-6) | 5% |
| 5-HGB(F,F)—F | (4-6) | 4% |
| 3-BB(F,F)XB(F,F)—F | (4-18) | 4% |
| 3-GBB(F)B(F,F)—F | (4-22) | 2% |

NI = 71.9° C.;
Tc < −20° C.;
Δn = 0.079;
Δε = 4.3;
Vth = 1.99 V;
η = 12.6 mPa · s.

Example 3

| | | |
|---|---|---|
| 3-HHXB(F,F)—XCF3 | (1-2) | 6% |
| 3-BB(F,F)XB(F,F)—XCF3 | (1-4) | 5% |
| 3-HBB(F,F)XB—XCF3 | (1-6) | 4% |
| 3-HBB(F,F)—XCF3 | (1-12) | 5% |
| 3-HH—V | (2) | 25% |
| 4-HH—V1 | (2) | 5% |
| 5-HH—V | (2) | 5% |
| VFF2-HHB-1 | (3-4) | 5% |
| 3-HBB-2 | (3-5) | 5% |
| 5-B(F)BB-2 | (3-7) | 4% |
| 5-HBB(F)B-2 | (3-12) | 5% |
| 5-HBB(F)B-3 | (3-12) | 5% |
| 5-HXB(F,F)—F | (4-1) | 3% |
| 3-HHB(F,F)—F | (4-2) | 3% |
| 5-HHB(F,F)—F | (4-2) | 3% |
| 3-HBEB(F,F)—F | (4-10) | 5% |
| 3-BB(2F,3F)BXB(F,F)—F | (4-34) | 3% |
| 2-HH-3 | (—) | 4% |

NI = 83.0° C.;
Tc <−20° C.;
Δn = 0.107;
Δε = 3.8;
Vth = 2.14 V;
η = 18.3 mPa · s.

Example 4

| | | |
|---|---|---|
| 3-dhBB(F,F)XB(F,F)—XCF3 | (1-7) | 3% |
| 4-GB(F)B(F,F)XB(F,F)—XCF3 | (1-8) | 5% |
| 3-HBB—XCF3 | (1-12) | 5% |
| 3-HH—V | (2) | 13% |
| 3-HH—VFF | (2) | 20% |
| 5-HH—VFF | (2) | 5% |
| V2-BB-1 | (3-2) | 7% |
| V-HHB-1 | (3-4) | 8% |
| V2-HHB-1 | (3-4) | 5% |
| 2-BB(F)B-3 | (3-6) | 3% |
| 2-BB(F)B-5 | (3-6) | 3% |
| 3-HB(F)HH-2 | (3-8) | 5% |
| 3-HHEB(F,F)—F | (4-3) | 4% |
| 3-GB(F)B(F)—F | (4-11) | 4% |
| 3-GB(F)B(F,F)—F | (4-12) | 5% |
| 5-BB(F)B(F,F)XB(F,F)—F | (4-28) | 5% |

NI = 75.7° C.;
Tc <−20° C.;
Δn = 0.107;
Δε = 5.7;
Vth = 1.83 V;
η = 19.7 mPa · s.

Example 5

| | | |
|---|---|---|
| 3-BB(F,F)XB(F,F)—XCF3 | (1-4) | 10% |
| 3-BB(F)B(F,F)XB(F,F)—XCF3 | (1-9) | 3% |
| 3-GBB(F,F)—XCF3 | (1-13) | 3% |
| 3-BB(F)B—XCF3 | (1-14) | 5% |
| 3-HH—V | (2) | 25% |
| 1-HH-2V1 | (2) | 5% |
| 3-HH-2V1 | (2) | 3% |
| 1-BB-3 | (3-2) | 8% |
| 3-HHB-O1 | (3-4) | 4% |
| 3-HHB-1 | (3-4) | 5% |
| 3-HHB-3 | (3-4) | 3% |
| 1-BB(F)B-2V | (3-6) | 4% |
| 3-BB(F)B-2V | (3-6) | 4% |
| 3-HHEBH-3 | (3-9) | 3% |
| 3-HHEBH-5 | (3-9) | 3% |
| 3-HHXB(F,F)—CF3 | (4-5) | 4% |
| 5-GHB(F,F)—F | (4-7) | 3% |
| 3-BB(2F,3F)—O2 | (5-4) | 5% |

NI = 74.4° C.;
Tc <−20° C.;
Δn = 0.116;
Δε = 4.2;
Vth = 2.01 V;
η = 19.9 mPa · s.

Example 6

| | | |
|---|---|---|
| 3-HHXB(F,F)—XCF3 | (1-2) | 5% |
| 3-BB(F,F)XB(F,F)—XCF3 | (1-4) | 5% |
| 4-BB(F)B(F,F)XB(F,F)—XCF3 | (1-9) | 5% |
| 3-HB(F)B XCF3 | (1-12) | 5% |
| 3-HH—V | (2) | 28% |
| 3-HH—V1 | (2) | 8% |
| F3-HH—V | (2) | 3% |
| 7-HB-1 | (3-1) | 4% |
| 1V2-BB-1 | (3-2) | 4% |
| V—HHB-1 | (3-4) | 9% |
| V2-HHB-1 | (3-4) | 7% |
| 3-HBB(F,F)—F | (4-8) | 3% |
| 5-HBB(F,F)—F | (4-8) | 3% |
| 2-HBEB(F,F)—F | (4-10) | 3% |
| 3-BB(F)B(F,F)—F | (4-15) | 4% |
| 1O1-HBBH-5 | (—) | 4% |

NI = 72.2° C.;
Tc <−20° C.;
Δn = 0.096;
Δε = 4.5;
Vth = 1.96 V;
η =15.0 mPa · s.

Example 7

| | | |
|---|---|---|
| 3-HXB(F,F)—XCF3 | (1-1) | 5% |
| 3-BB(F,F)XB(F,F)—XCF3 | (1-4) | 8% |
| 3-BB(F)B(F,F)—XCF3 | (1-14) | 5% |
| 3-HH—V | (2) | 25% |
| 3-HH—V1 | (2) | 10% |
| F3-HH—V1 | (2) | 5% |
| V—HHB-1 | (3-4) | 10% |
| V2-HHB-1 | (3-4) | 8% |
| 5-HBBH-3 | (3-10) | 4% |
| 5-HB(F)BH-3 | (3-11) | 5% |
| 3-HB(F)B(F,F)—F | (4-9) | 3% |
| 5-HB(F)B(F,F)—F | (4-9) | 4% |
| 3-GB(F,F)XB(F)—F | (4-13) | 4% |
| 3-GB(F,F)XB(F,F)—F | (4-14) | 4% |

NI = 71.4° C.;
Tc <−20° C.;
Δn = 0.089;
Δε = 4.8;
Vth = 1.94 V;
η = 15.2 mPa · s.

Example 8

| | | |
|---|---|---|
| 3-BB(F,F)XB(F,F)—XCF3 | (1-4) | 8% |
| 3-HBB(F,F)XB—XCF3 | (1-6) | 4% |
| 3-BB(F)B(F,F)XB(F,F)—XCF3 | (1-9) | 3% |
| 3-HBB(F)—XCF3 | (1-12) | 5% |
| 3-HH—V | (2) | 15% |
| 4-HH—V | (2) | 10% |
| V2-BB-1 | (3-2) | 8% |
| VFF—HHB-1 | (3-4) | 5% |
| V—HHB-1 | (3-4) | 5% |
| V2-HHB-1 | (3-4) | 5% |
| V-HBB-2 | (3-5) | 6% |
| 1-BB(F)B-2V | (3-6) | 4% |
| 2-BB(F)B-2V | (3-6) | 5% |
| 3-BB(F)B(F,F)—CF3 | (4-16) | 3% |
| 3-BBXB(F,F)—F | (4-17) | 5% |
| 3-GB(F)B(F)B(F)—F | (4-21) | 3% |
| 3-HBB(F,F)XB(F,F)—F | (4-24) | 3% |
| 2-HH-3 | (—) | 3% |

NI = 76.3° C.;
Tc <−20° C.;
Δn = 0.128;
Δε = 6.4;
Vth = 1.76 V;
η = 18.5 mPa · s.

Example 9

| | | |
|---|---|---|
| 3-BB(F,F)XB(F,F)—XCF3 | (1-4) | 5% |
| 3-HBBXB(F,F)—XCF3 | (1-6) | 5% |
| 4-BB(F)B(F,F)XB(F,F)—XCF3 | (1-9) | 4% |
| 3-HB(F)B—XCF3 | (1-12) | 4% |
| 3-HH—V | (2) | 30% |
| 3-HH—V1 | (2) | 10% |
| 1V2-BB-1 | (3-2) | 6% |
| V—HHB-1 | (3-4) | 7% |
| V2-HHB-1 | (3-4) | 5% |
| V—HBB-3 | (3-5) | 4% |
| 3-dhBB(F,F)XB(F,F)—F | (4-25) | 3% |
| 3-GB(F)B(F,F)XB(F,F)—F | (4-27) | 3% |
| 3-BB(F)B(F,F)XB(F,F)—F | (4-28) | 4% |
| V—HHB(2F,3F)—O2 | (5-6) | 5% |
| 3-HBB(2F,3F)—O2 | (5-13) | 5% |

NI = 84.8° C.;
Tc <−20° C.;
Δn = 0.111;
Δε = 5.0;
Vth = 1.90 V;
η = 17.5 mPa · s.

Example 10

| | | |
|---|---|---|
| 3-BB(F,F)XB(F,F)—XCF3 | (1-4) | 10% |
| 3-HBB(F,F)—XCF3 | (1-12) | 5% |
| 3-BB(F)B(F,F)—XCF3 | (1-14) | 5% |
| 3-HH—V | (2) | 20% |
| 3-HH—V1 | (2) | 15% |
| 4-HH—V | (2) | 5% |
| 5-HB—O2 | (3-1) | 4% |
| 7-HB-1 | (3-1) | 5% |
| 1-BB(F)B-2V | (3-6) | 4% |
| 3-BB(F)B-2V | (3-6) | 4% |
| 3-HHEBH-3 | (3-9) | 3% |
| 3-HHEBH-4 | (3-9) | 3% |
| 3-HHBB(F,F)—F | (4-19) | 4% |
| 5-HHBB(F,F)—F | (4-19) | 4% |
| 3-HHB(F)B(F,F)—F | (4-20) | 3% |
| 3-HBBXB(F,F)—F | (4-23) | 3% |
| 3-BB(2F,3F)XB(F,F)—F | (4-31) | 3% |

NI = 81.6° C.;
Tc <−20° C.;
Δn = 0104;
Δε = 4.6;
Vth = 1.95 V;
η = 19.3 mPa · s.

Example 11

| | | |
|---|---|---|
| 3-HXB(F,F)—XCF3 | (1-1) | 5% |
| 3-HHXB(F,F)—XCF3 | (1-2) | 5% |
| 3-dhBB(F,F)XB(F,F)—XCF3 | (1-7) | 3% |
| 3-GBB(F,F)—XCF3 | (1-13) | 5% |
| 3-HH—V | (2) | 30% |
| 3-HH—V1 | (2) | 11% |
| V—HHB-1 | (3-4) | 10% |
| V2-HHB-1 | (3-4) | 8% |
| 1-BB(F)B-2V | (3-6) | 4% |
| 2-BB(F)B-2V | (3-6) | 5% |
| 3-BB(F)B-2V | (3-6) | 4% |
| 4-GB(F)B(F,F)XB—F | (4-26) | 5% |
| 3-BB(F,F)XB(F)B(F,F)—F | (4-29) | 5% |

NI = 80.9° C.;
Tc <−20° C.;
Δn = 0.107;
Δε = 3.9;
Vth = 2.05 V;
η = 16.2 mPa · s.

Example 12

| | | |
|---|---|---|
| 3-BB(F,F)XB(F,F)—XCF3 | (1-4) | 9% |
| 4-GB(F)B(F,F)XB(F,F)—XCF3 | (1-8) | 4% |
| 3-HBB—XCF3 | (1-12) | 6% |
| 3-BB(F)B—XCF3 | (1-14) | 4% |
| 4-HH—V | (2) | 12% |
| 4-HH—V1 | (2) | 8% |
| 5-HH—V | (2) | 10% |
| V2-BB-1 | (3-2) | 6% |
| 3-HHB-1 | (3-4) | 6% |
| V—HHB-1 | (3-4) | 8% |
| V2-HHB-1 | (3-4) | 6% |
| 2-BB(F)B-3 | (3-6) | 6% |
| 2-BB(F)B-5 | (3-6) | 6% |
| 5-BB(F)B(F,F)XB(F,F)—F | (4-28) | 3% |
| 3-B(2F,3F)BXB(F,F)—F | (4-32) | 3% |
| 3-HB(2F,3F)BXB(F,F)—F | (4-33) | 3% |

NI = 73.9° C.;
Tc <−20° C.;
Δn = 0.121;
Δε = 5.4;
Vth = 1.87 V;
η = 18.3 mPa · s.

Example 13

| | | |
|---|---|---|
| 3-BB(F,F)XB(F,F)—XCF3 | (1-4) | 10% |
| 3-BB(F)B(F,F)XB(F,F)—XCF3 | (1-9) | 5% |
| 3-BB(F)B(F,F)—XCF3 | (1-14) | 5% |
| 3-HH—V | (2) | 30% |
| 3-HH—V1 | (2) | 10% |
| F3-HH—V1 | (2) | 3% |
| V2-BB-1 | (3-2) | 6% |
| V—HHB-1 | (3-4) | 10% |
| V2-HHB-1 | (3-4) | 7% |
| V—HBB-2 | (3-5) | 7% |
| 3-BB(F)B-2V | (3-6) | 4% |
| 5-BB(F)B(F,F)XB(F)B(F,F)—F | (4-30) | 3% |

NI = 75.1° C.;
Tc <−20° C.;
Δn = 0.111;
Δε = 4.9;
Vth = 1.95 V;
η = 13.0 mPa · s.

Example 14

| | | |
|---|---|---|
| 3-HHXB(F,F)—XCF3 | (1-2) | 4% |
| 3-BB(F,F)XB(F,F)—XCF3 | (1-4) | 7% |
| 3-HBB(F,F)—XCF3 | (1-12) | 3% |
| 3-HBB(F)—XCF3 | (1-12) | 4% |
| 3-HH—V | (2) | 29% |
| 1-HH-2V1 | (2) | 5% |
| 1-BB-3 | (3-2) | 4% |
| V2-BB-1 | (3-2) | 6% |
| V—HHB-1 | (3-4) | 10% |
| V2-HHB-1 | (3-4) | 8% |
| 5-HBB(F)B-2 | (3-12) | 5% |
| 3-BB(F,F)XB(F,F)—F | (4-18) | 5% |
| 3-HBBXB(F,F)—F | (4-23) | 5% |
| 4-BB(F)B(F,F)XB(F,F)—F | (4-28) | 5% |

NI = 721° C.;
Tc <−20° C.;
Δn = 0.109;
Δε = 5.0;
Vth = 1.89 V;
η = 14.6 mPa · s.

The value of the dielectric anisotropy (Δ∈) of the composition in Comparative Example 1 was 2.8. On the other hand, the Δ∈ value of the composition in Example 1 was 3.9. Thus, the composition of Example 1 in which the composition contains compound (1) had a large dielectric anisotropy in comparison with the composition of Comparative Example 1. Accordingly, the liquid crystal composition of the invention is concluded to have good characteristics.

Though the invention has been described and illustrated with a certain degree of particularity, it is understood that the disclosure is made only by way of example, and that numerous changes in the conditions and order of steps can be resorted to by those skilled in the art without departing from the spirit and scope of the invention.

INDUSTRIAL APPLICABILITY

The liquid crystal composition of the invention satisfies at least one of characteristics such as a high maximum temperature, a low minimum temperature, a small viscosity, a suitable optical anisotropy, a large dielectric anisotropy, a large specific resistance, a high stability to UV light, a high stability to heat and a large elastic constant, or has a suitable balance between at least two of the characteristics. The LCD device including the composition of the invention has a short response time, a large voltage holding ratio, a large contrast ratio, a long service life and so on, and thus can be used for a liquid crystal projector, a liquid crystal television and so on.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The invention claimed is:

1. A liquid crystal composition that has a nematic phase and contains at least one compound represented by formula (1) as a first component and at least one compound represented by formula (2) as a second component:

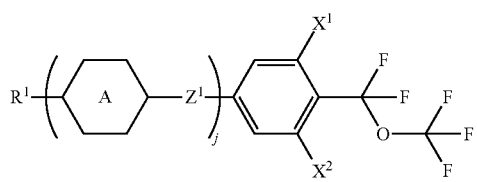
(1)

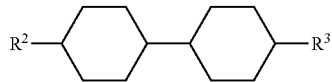

wherein in formulas (1) and (2), R is alkyl having 1 to 12 carbons, alkoxy having 1 to 12 carbons or alkenyl having 2 to 12 carbons; $R^2$ is alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; $R^3$ is alkenyl having 2 to 12 carbons, or alkenyl having 2 to 12 carbons in which at least one hydrogen is replaced by halogen; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl, tetrahydropyran-2,5-diyl or naphthalene-2,6-diyl; $Z^1$ is a single bond, ethylene, vinylene, methyleneoxy, carbonyloxy or difluoromethyleneoxy, wherein at least one of $Z^1$ is difluoromethyleneoxy; $X^1$ and $X^2$ are independently hydrogen or fluorine; and j is 1, 2, 3 or 4.

2. The liquid crystal composition of claim 1, containing at least one compound selected from the group of compounds represented by formulas (1-1) to (1-11) as the first component:

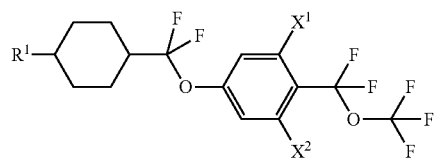
(1-1)

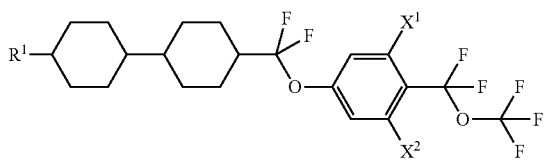
(1-2)

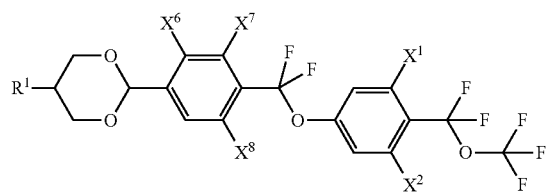

(1-3) (1-4)

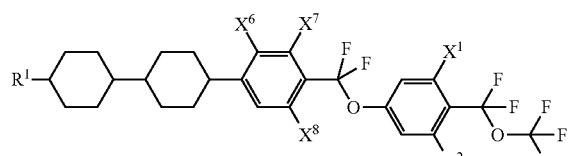

(1-5) (1-6)

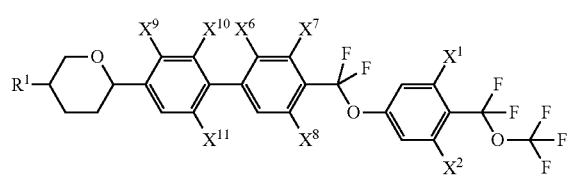

(1-7) (1-8)

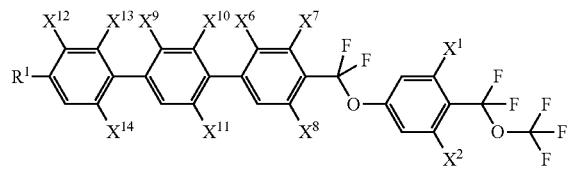
(1-9)

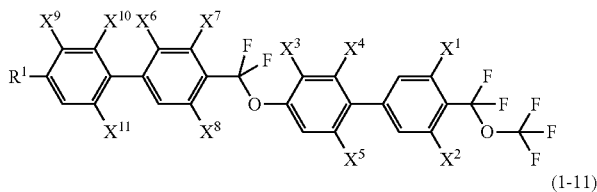
(1-10)

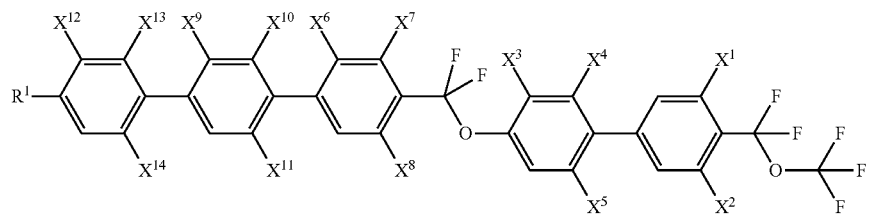
(1-11)

wherein in formulas (1-1) to (1-11), $R^1$ is alkyl having 1 to 12 carbons, alkoxy having 1 to 12 carbons or alkenyl having 2 to 12 carbons; and $X^1$, $X^2$, $X^3$, $X^4$, $X^5$, $X^6$, $X^7$, $X^8$, $X^9$, $X^{10}$, $X^{11}$, $X^{12}$, $X^{13}$ and $X^{14}$ are independently hydrogen or fluorine.

3. The liquid crystal composition of claim 1, wherein a proportion of the first component is in a range of 5 wt % to 40 wt %, and a proportion of the second component is in a range of 5 wt % to 60 wt %, based on a weight of the liquid crystal composition.

4. The liquid crystal composition of claim 1, further containing at least one compound represented by formula (3) as a third component:

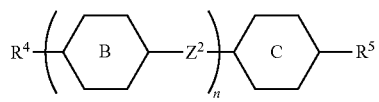
(3)

wherein in formula (3), $R^4$ and $R^5$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3; and when n is 1, ring C is 1,4-phenylene.

5. The liquid crystal composition of claim 4, containing at least one compound selected from the group of compounds represented by formulas (3-1) to (3-12) as the third component:

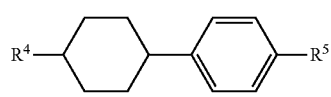
(3-1)

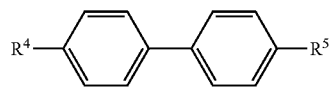
(3-2)

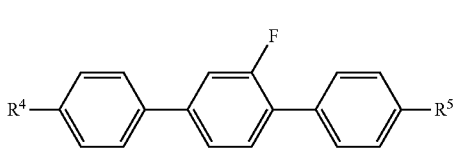
(3-3)

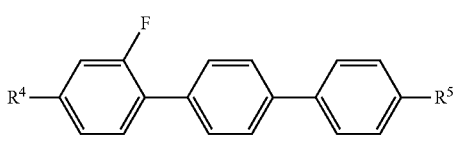
(3-4)

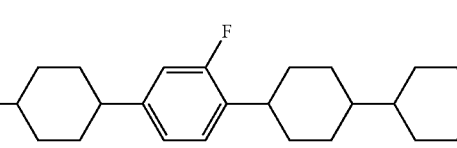
(3-5)

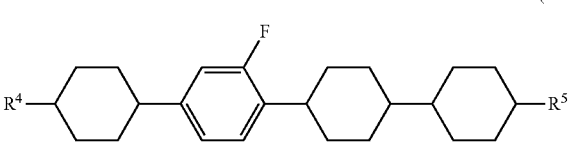
(3-6)

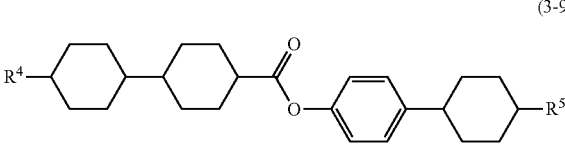
(3-7)

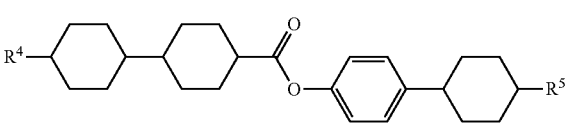
(3-8)

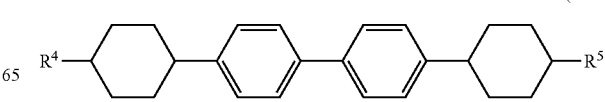
(3-9)

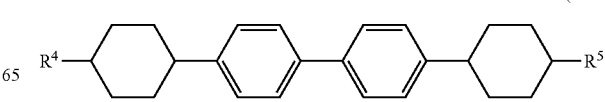
(3-10)

-continued (3-11)

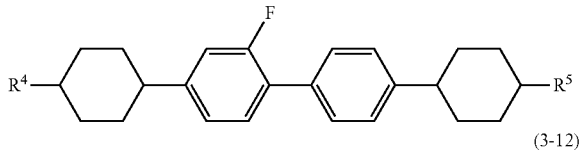

(3-12)

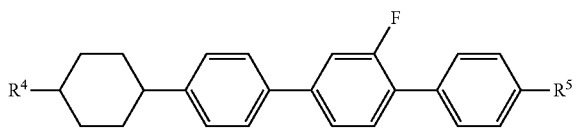

wherein in formulas (3-1) to (3-12), $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen is replaced by halogen.

6. The liquid crystal composition of claim 4, wherein a proportion of the third component is in a range of 5 wt % to 70 wt % based on a weight of the liquid crystal composition.

7. The liquid crystal composition of claim 1, further containing at least one compound represented by formula (4) as a fourth component:

(4)

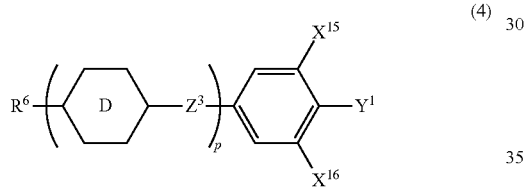

wherein in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,3-difluoro-1,4-phenylene, 2,6-difluoro-1,4-phenyl ene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{15}$ and $X^{16}$ are independently hydrogen or fluorine; $Y^1$ is fluorine, chlorine, alkyl having 1 to 12 carbons in which at least one hydrogen is replaced by halogen, alkoxy having 1 to 12 carbons in which at least one hydrogen is replaced by halogen, or alkenyloxy having 2 to 12 carbons in which at least one hydrogen is replaced by halogen; and p is 1, 2, 3 or 4.

8. The liquid crystal composition of claim 4, further containing at least one compound represented by formula (4) as a fourth component:

(4)

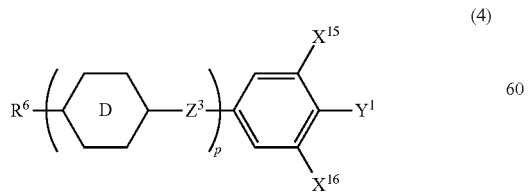

wherein in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{15}$ and $X^{16}$ are independently hydrogen or fluorine; $Y^1$ is fluorine, chlorine, alkyl having 1 to 12 carbons in which at least one hydrogen is replaced by halogen, alkoxy having 1 to 12 carbons in which at least one hydrogen is replaced by halogen, or alkenyloxy having 2 to 12 carbons in which at least one hydrogen is replaced by halogen; and p is 1, 2, 3 or 4.

9. The liquid crystal composition of claim 7, containing at least one compound selected from the group of compounds represented by formulas (4-1) to (4-34) as the fourth component:

(4-1)

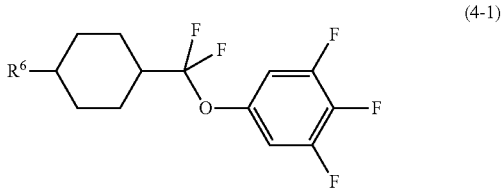

(4-2)

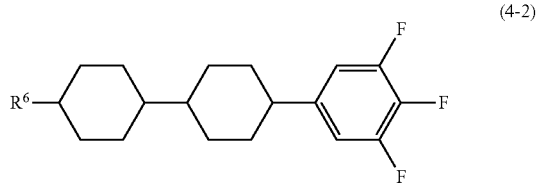

(4-3)

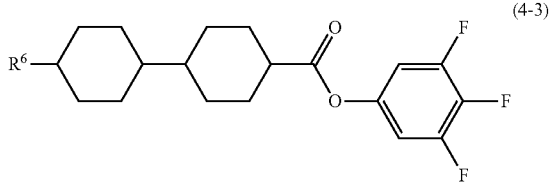

(4-4)

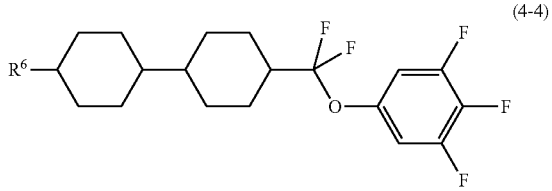

(4-5)

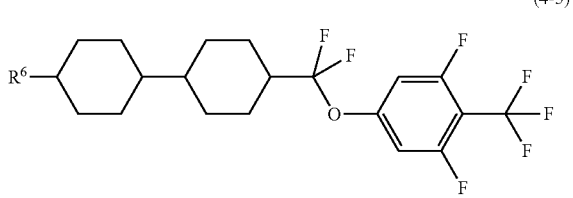

(4-6)

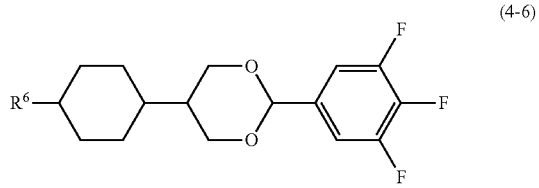

(4-7) 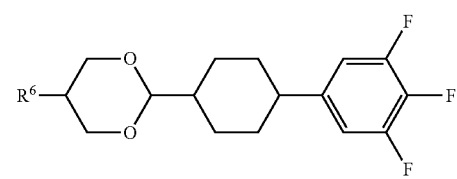
(4-8) 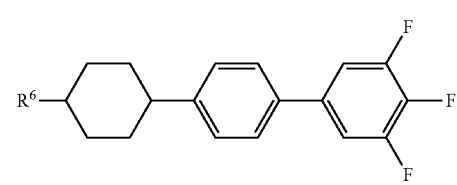
(4-9) 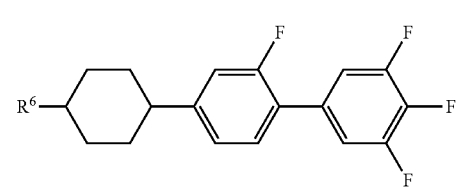
(4-10) 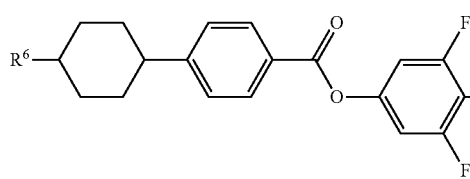
(4-11) 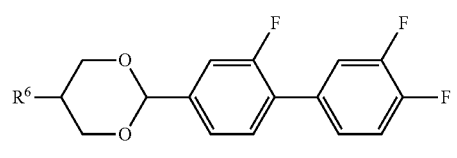
(4-12) 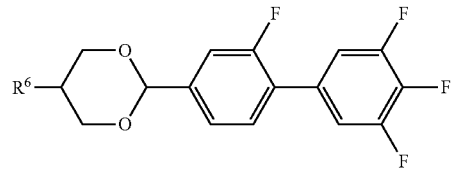
(4-13) 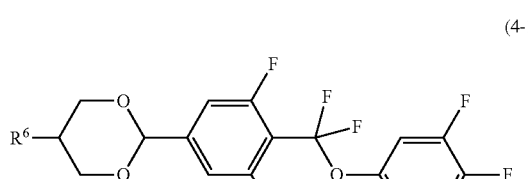
(4-14) 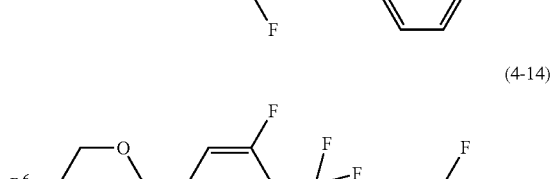
(4-15) 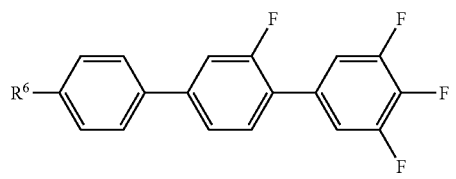
(4-16) 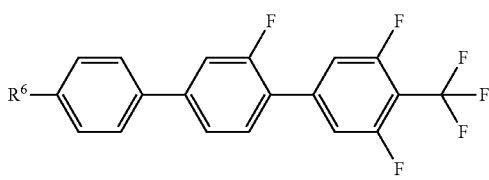
(4-17) 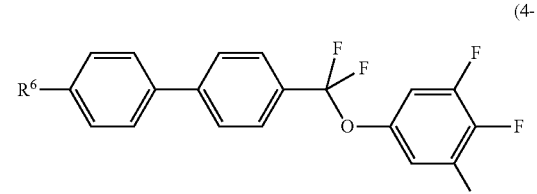
(4-18) 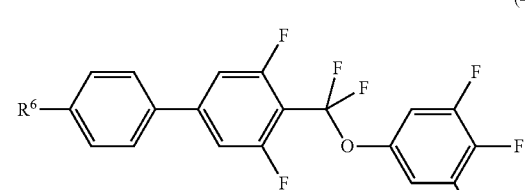
(4-19) 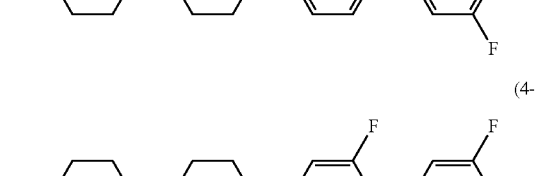
(4-20) 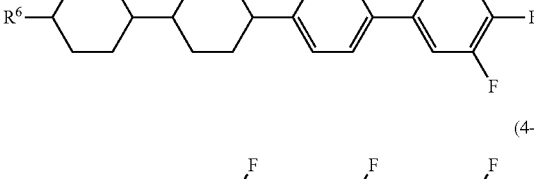
(4-21) 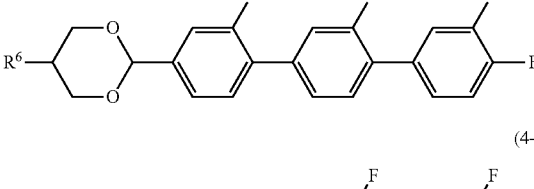
(4-22) 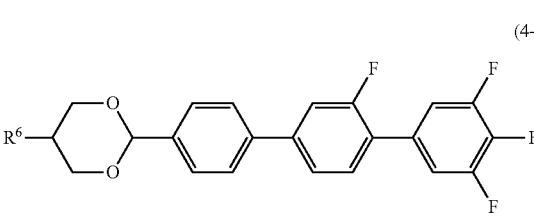

-continued
(4-23) 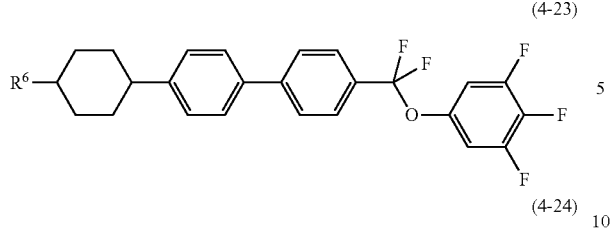
(4-24) 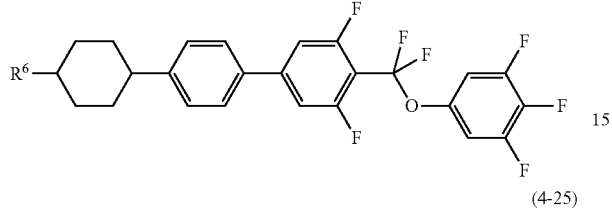
(4-25) 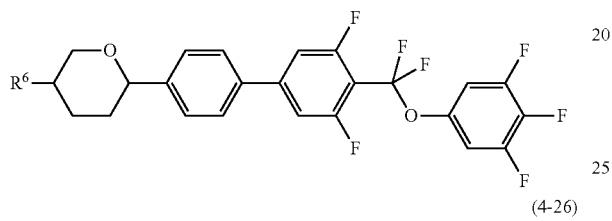
(4-26) 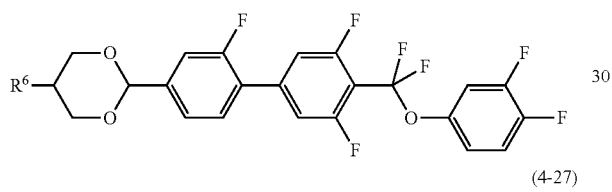
(4-27) 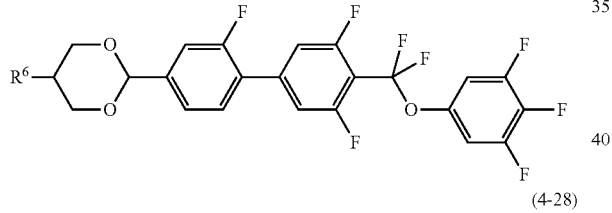
(4-28) 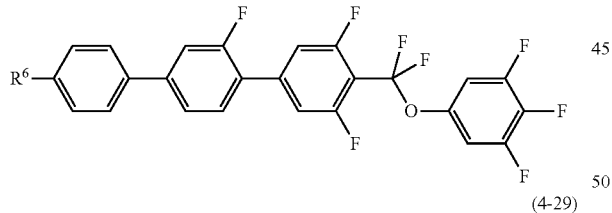
(4-29) 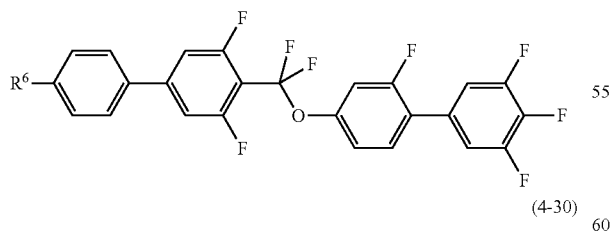
-continued
(4-31) 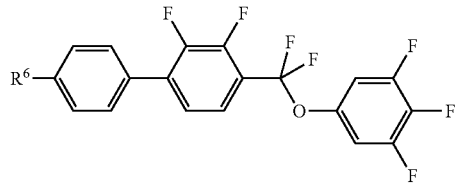
(4-32) 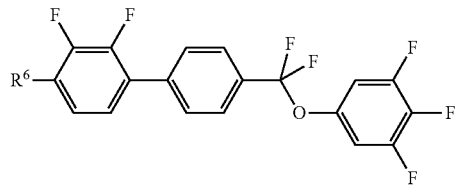
(4-33) 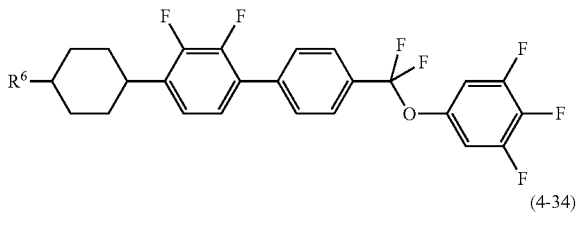
(4-34) 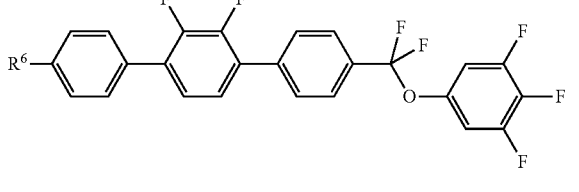
wherein in formulas (4-1) to (4-34), $R^6$ is alkyl having 1 to 12 carbons, alkoxy having 1 to 12 carbons or alkenyl having 2 to 12 carbons.
10. The liquid crystal composition of claim 8, containing at least one compound selected from the group of compounds represented by formulas (4-1) to (4-34) as the fourth component:
(4-1) 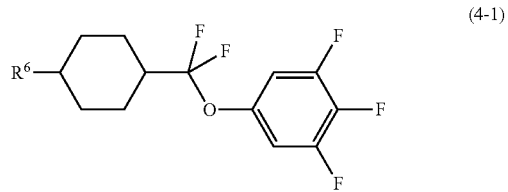
(4-2) 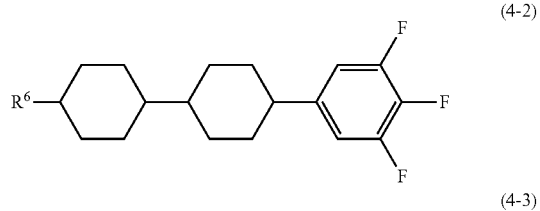
(4-3) 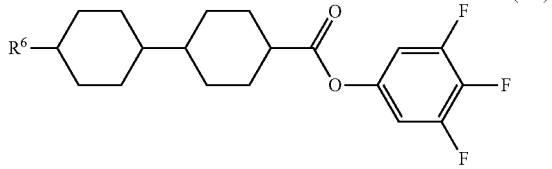

(4-4) 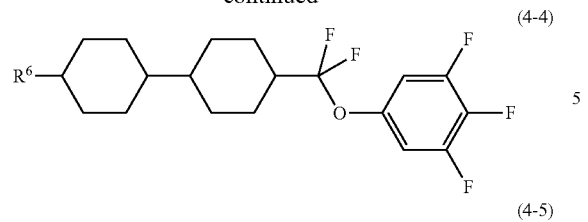
(4-5) 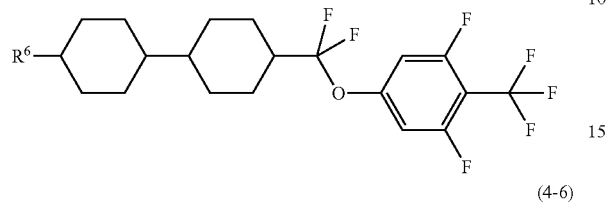
(4-6) 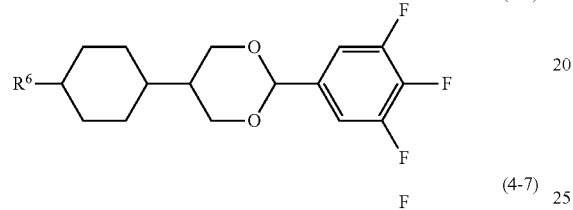
(4-7) 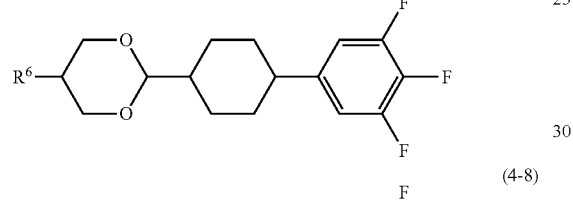
(4-8) 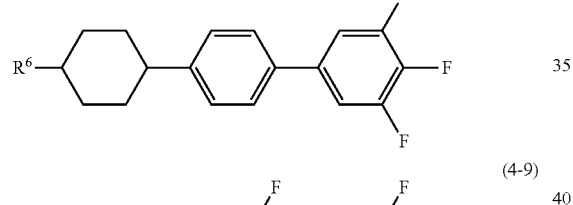
(4-9) 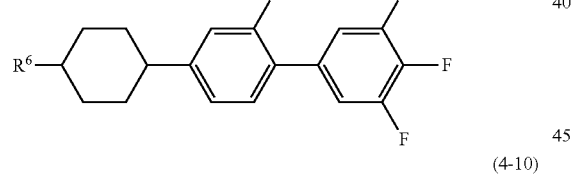
(4-10) 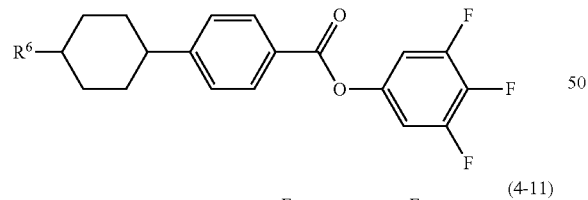
(4-11) 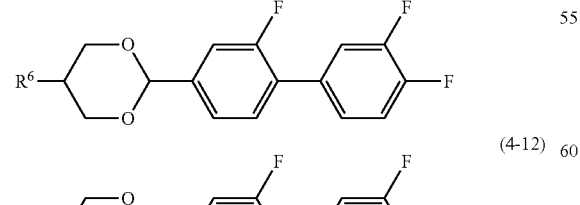
(4-12) 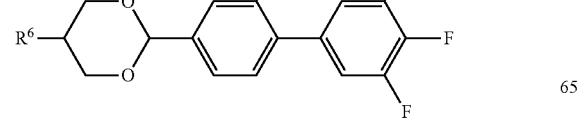
(4-13) 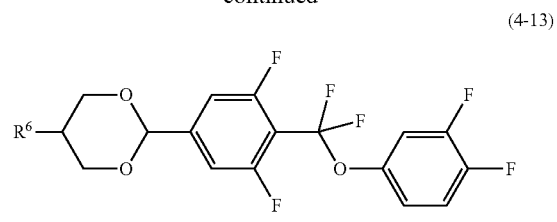
(4-14) 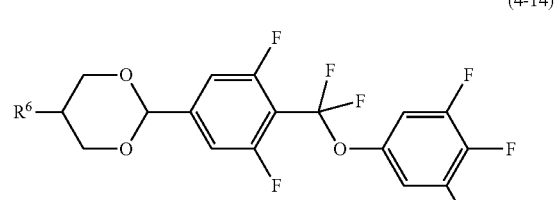
(4-15) 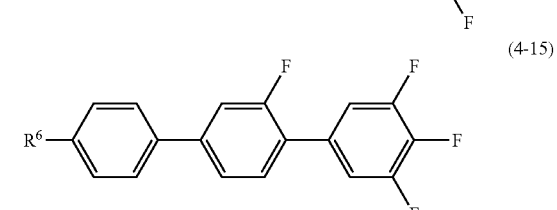
(4-16) 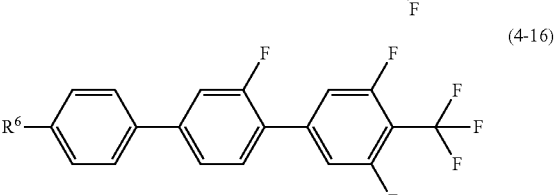
(4-17) 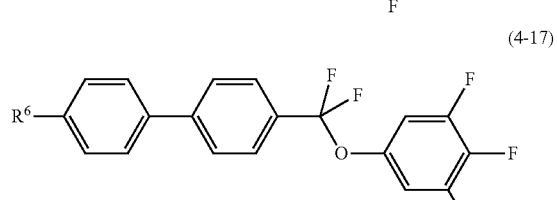
(4-18) 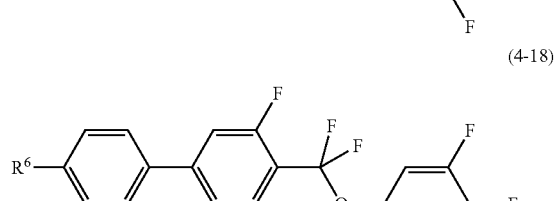
(4-19) 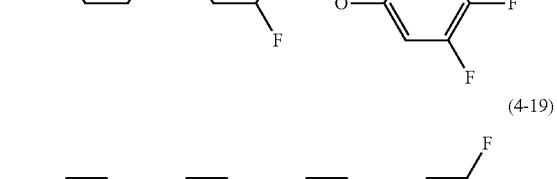
(4-20) 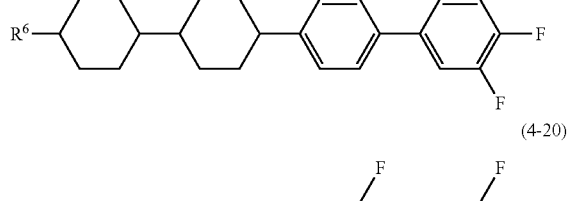
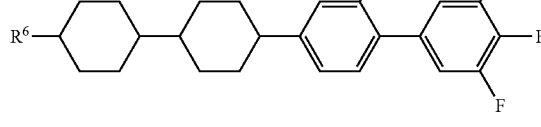

(4-21)
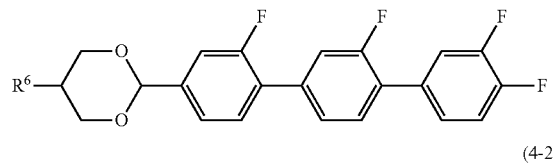

(4-22)
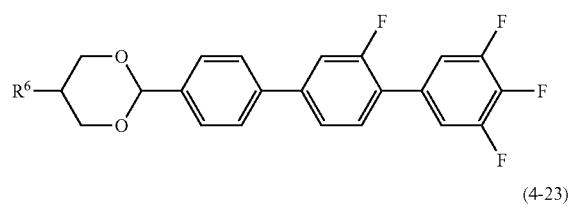

(4-23)
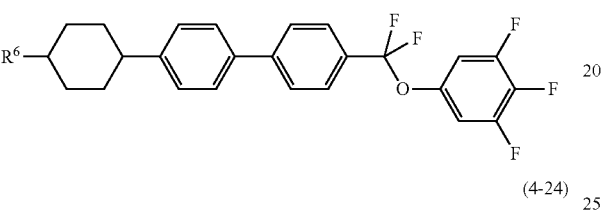

(4-24)
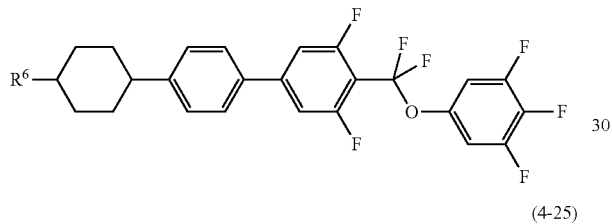

(4-25)
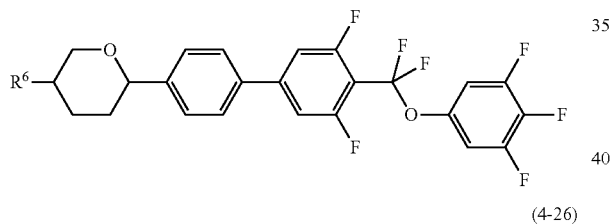

(4-26)
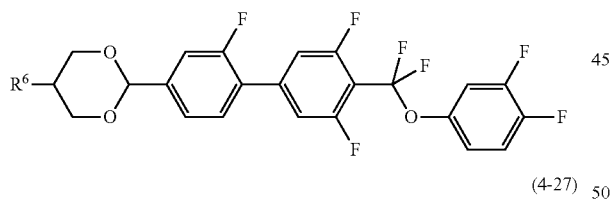

(4-27)
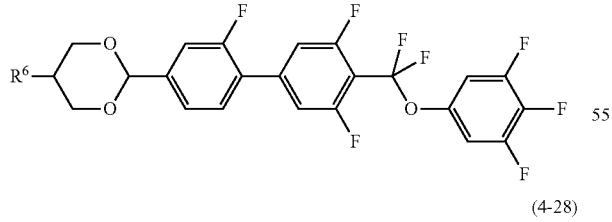

(4-28)
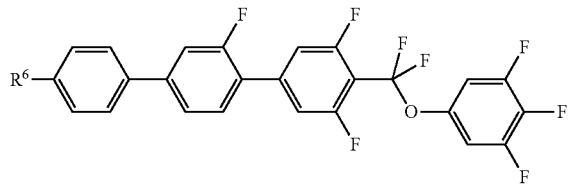

(4-29)
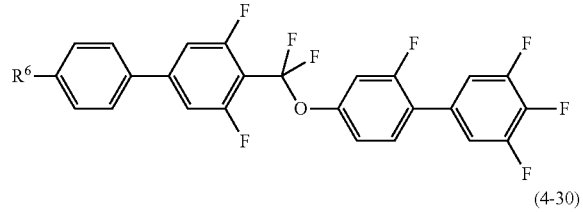

(4-30)
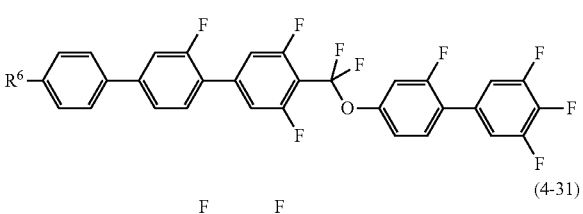

(4-31)
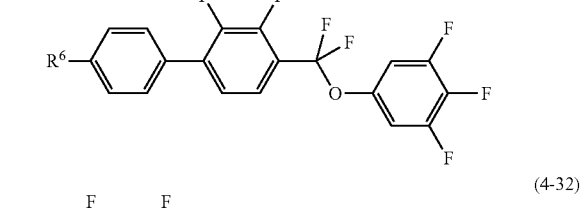

(4-32)
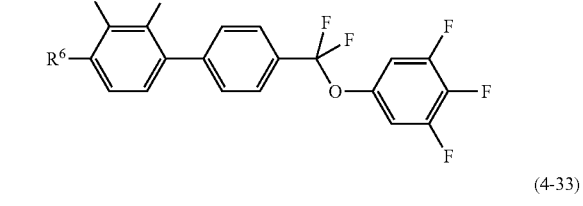

(4-33)
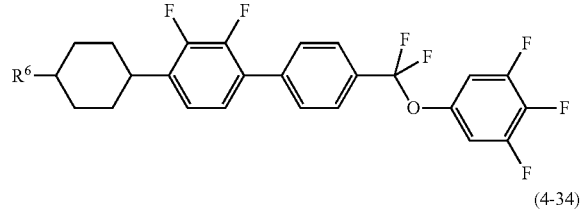

(4-34)
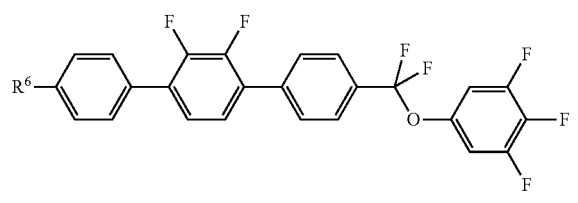

wherein in formulas (4-1) to (4-34), $R^6$ is alkyl having 1 to 12 carbons, alkoxy having 1 to 12 carbons or alkenyl having 2 to 12 carbons.

11. The liquid crystal composition of claim 7, wherein a proportion of the fourth component is in a range of 3 wt % to 40 wt % based on a weight of the liquid crystal composition.

12. The liquid crystal composition of claim 8, wherein a proportion of the fourth component is in a range of 3 wt % to 40 wt % based on a weight of the liquid crystal composition.

13. The liquid crystal composition of claim 1, containing at least one compound represented by formula (5) as a fifth component:

(5)

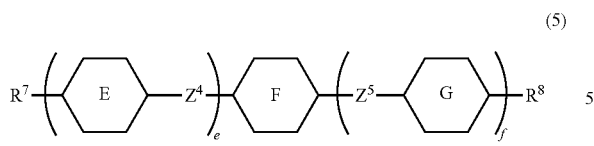

wherein in formula (5), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring E and ring G are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; e is 1, 2 or 3, and f is 0 or 1; and a sum of e and f is 3 or less.

14. The liquid crystal composition of claim 8, containing at least one compound represented by formula (5) as a fifth component:

(5)

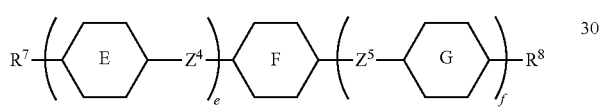

wherein, in formula (5), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring E and ring G are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; e is 1, 2 or 3, and f is 0 or 1; and a sum of e and f is 3 or less.

15. The liquid crystal composition of claim 13, containing at least one compound selected from the group of compounds represented by formulas (5-1) to (5-19) as the fifth component:

(5-1)

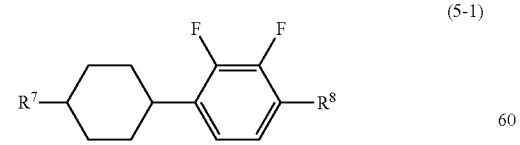

(5-2)

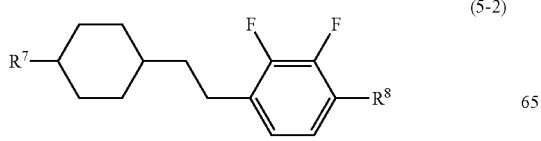

(5-3)

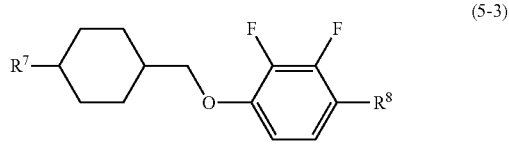

(5-4)

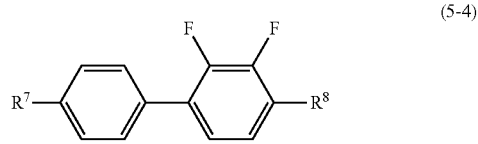

(5-5)

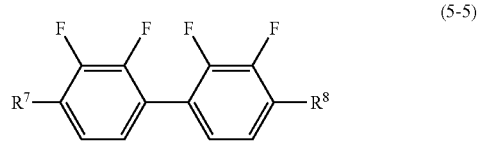

(5-6)

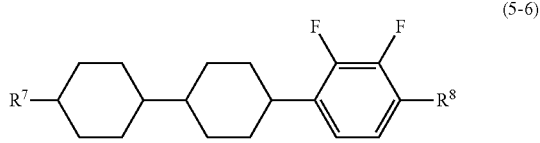

(5-7)

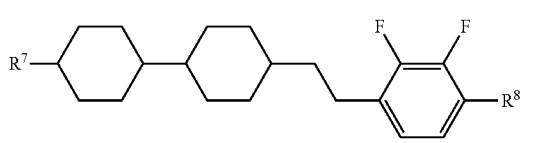

(5-8)

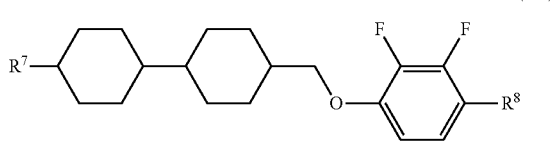

(5-9)

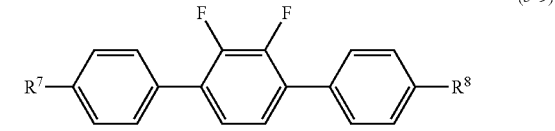

(5-10)

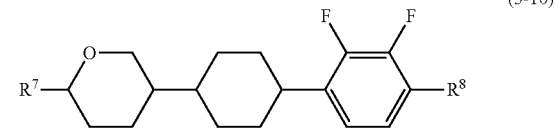

(5-11)

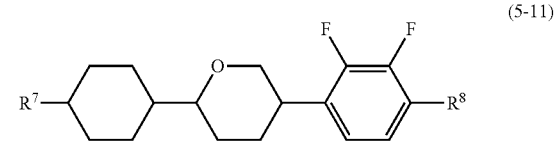

(5-12)

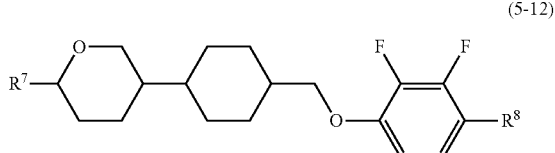

(5-13)

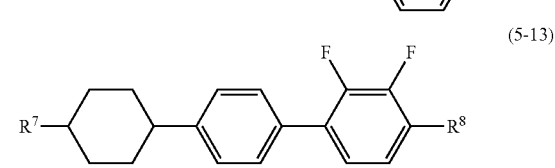

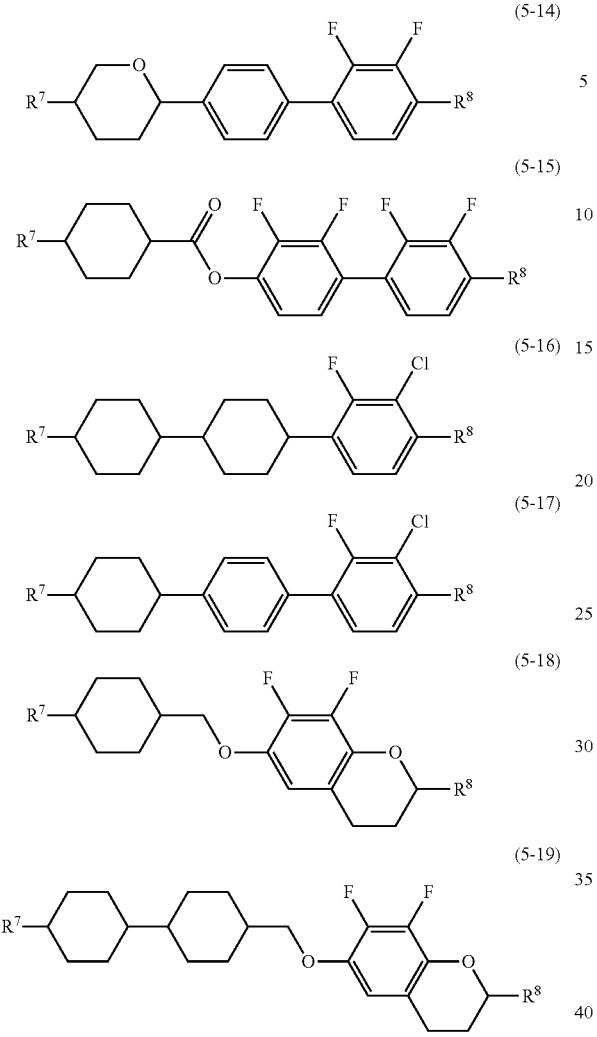
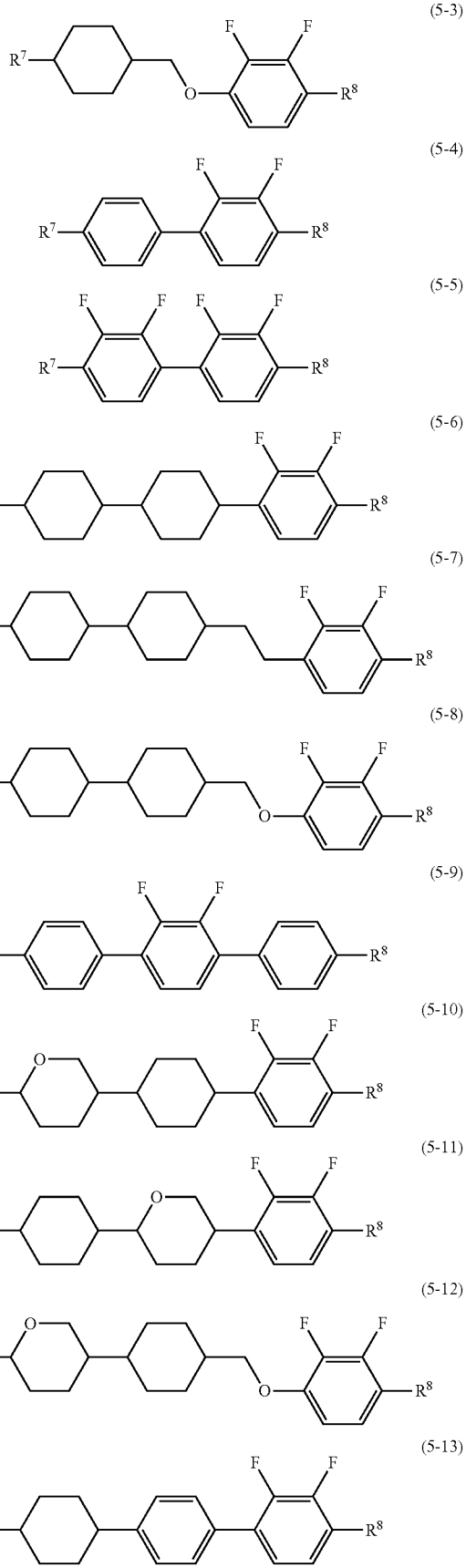

wherein in formulas (5-1) to (5-19), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one of hydrogen is replaced by halogen.

16. The liquid crystal composition of claim 14, containing at least one compound selected from the group of compounds represented by formulas (5-1) to (5-19) as the fifth component:

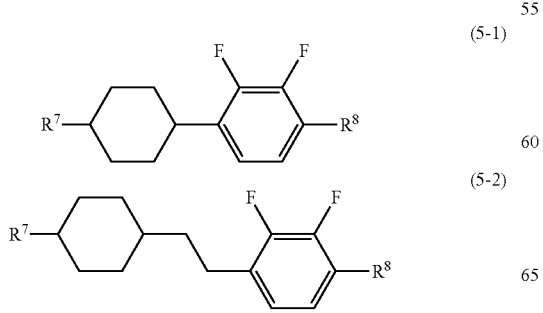

(5-14)
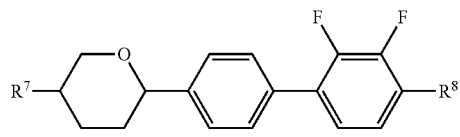

(5-15)
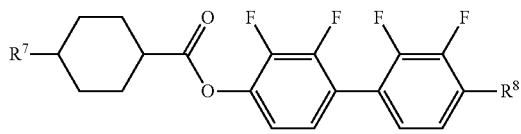

(5-16)
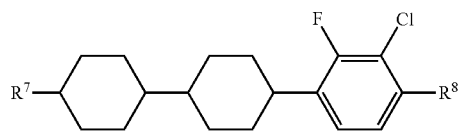

(5-17)
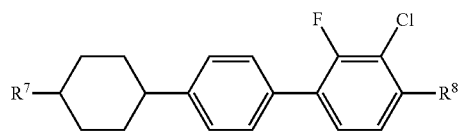

(5-18)
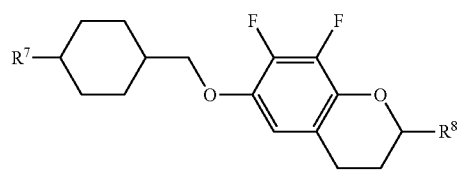

(5-19)
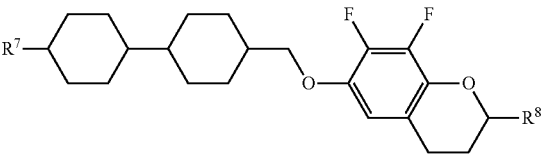

wherein in formulas (5-1) to (5-19), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one of hydrogen is replaced by halogen.

17. The liquid crystal composition of claim 13, wherein a proportion of the fifth component is in a range of 3 wt % to 25 wt % based on a weight of the liquid crystal composition.

18. The liquid crystal composition of claim 1, of which a maximum temperature of a nematic phase is 70° C. or higher, an optical anisotropy (measured at 25° C.) at a wavelength of 589 nanometers is 0.07 or more, and a dielectric anisotropy (measured at 25° C.) at a frequency of 1 kHz is 2 or more.

19. A liquid crystal display device, including the liquid crystal composition of claim 1.

20. The liquid crystal display device of claim 19, of which an operating mode is a TN mode, an ECB mode, an OCB mode, an IPS mode, an FFS mode or an FPA mode, and a driving mode is an active matrix mode.

* * * * *